United States Patent
Kawaguchi et al.

(10) Patent No.: US 11,647,360 B2
(45) Date of Patent: May 9, 2023

(54) INFORMATION PROCESSING FOR SPECIFYING A VECTOR REPRESENTATION REPRESENTING A FEATURE OF A TEMPORAL USAGE PATTERN OF AN AREA

(71) Applicants: National University Corporation Tokai National Higher Education and Research System, Nagoya (JP); Blogwatcher Inc., Tokyo (JP)

(72) Inventors: Nobuo Kawaguchi, Nagoya (JP); Kazuyuki Shoji, Nagoya (JP); Takuro Yonezawa, Nagoya (JP); Masato Sakata, Tokyo (JP)

(73) Assignees: National University Corporation Tokai National Higher Education and Research System, Nagoya (JP); Blogwatcher Inc., Tokyo (JP)

( * ) Notice: Subject to any disclaimer, the term of this patent is extended or adjusted under 35 U.S.C. 154(b) by 62 days.

(21) Appl. No.: 17/205,532

(22) Filed: Mar. 18, 2021

(65) Prior Publication Data
US 2022/0201432 A1 Jun. 23, 2022

(30) Foreign Application Priority Data
Dec. 17, 2020 (JP) .............................. JP2020-209558

(51) Int. Cl.
*H04W 4/029* (2018.01)
(52) U.S. Cl.
CPC ................................. *H04W 4/029* (2018.02)

(58) Field of Classification Search
None
See application file for complete search history.

(56) References Cited

PUBLICATIONS

Zhang et al.—A system of mining semantic trajecory patterns from GPS data of real users; Jul. 8, 2019; MDPI/Symmetry (Year: 2019).*
Shoji et al., "A Study of Distributed Expression for Spatio-temporal Semantics Depending on Individuals" IPSJ SIG Technical Report, vol. 2020-MBL-94 No. 30, pp. 1-2 posted on the website of the online journal on Feb. 24, 2020(English Summary attached).
Shoji et al. "A Study of Distributed Expression for Each Area using Time Series Information on Staying" pp. 1008-1013 of the proceedings of the below online symposium 3, posted on the website on Jun. 17, 2020 (English Summary attached).
DICOMO 2020 Symposium (Multimedia, Distributed, Cooperative, and Mobile Symposium), presentation material, Shoji et al., posted online Jun. 25, 2020, https://www.dicomo.org/2020/ (English Summary attached).

(Continued)

*Primary Examiner* — Adolf Dsouza
(74) *Attorney, Agent, or Firm* — Posz Law Group, PLC

(57) ABSTRACT

An information processing apparatus specifies a vector representation which represents features of respective temporal usage patterns of two or more areas. The information processing apparatus includes a processor. The processor acquires area-specific usage pattern data which indicates which of two or more patterns the temporal usage pattern of each area is. The processor specifies, on the basis of the area-specific usage pattern data, a vector representation which represents the feature of the temporal usage pattern of each area.

18 Claims, 20 Drawing Sheets

(56) References Cited

PUBLICATIONS

Shoji et al.,"Analysis of Trajectory Modeling using Location Usage Information for Each Area" No. A1-4 of the proceedings of the below online conference 5, posted on the website of the conference on Aug. 24, 2020, https://www.jp-c.jp/rengo/www/cd/pdf/A1-4.pdf (English Summary attached).

Tokai-Section Joint Conference on Electrical, Electronics, Information, and Related Engineering, presentation material, Shoji et al., posted online Sep. 3, 2020,(English Summary attached).

Andrea Esuli, et al., "Traj2User: exploiting embeddings for computing similarity of users mobile behavior", [online], Cornell University, [Retrieved Dec. 1, 2020], Internet (https://arxiv.org/abs/1808.00554).

Wanlong Zhang, et al., "A system of mining semantic trajectory patterns from gps data of real users)", Symmetry, Jul. 2019, vol. 11, No. 7, p. 889.

\* cited by examiner

FIG.4

| area ID | day of week | arrival time | staying time length | staying pattern |
|---|---|---|---|---|
| 10 | holiday | 11:10 | 66 minutes | 105 |
| 23 | weekday | 8:30 | 360 minutes | 30 |
| 100 | holiday | 12:00 | 15 minutes | 109 |
| 3 | weekday | 19:30 | 120 minutes | 58 |

| day of week | weekday, holiday |
|---|---|
| arrival time | 0:00~1:59, 2:00~3:59, ..., 20:00~21:59, 22:00~23:59 (2-hour divisions) |
| staying time length | ~29 minutes, 30~59 minutes, 60~119 minutes, 120~239 minutes, 240~359 minutes, 360 minutes~ |

FIG.13

| user ID | day of week | time zone | staying cluster | temporal location pattern |
|---|---|---|---|---|
| 1 | holiday | 0:00~0:14 | 1a | 289 |
| 1 | holiday | 0:15~0:29 | 1a | 292 |
| ... | ... | ... | ... | ... |
| 1 | holiday | 23:45~23:59 | 2a | 575 |
| 2 | weekday | 0:00~0:14 | 3a | 3 |
| ... | ... | ... | ... | ... |
| 2 | weekday | 23:45~23:59 | 2a | 287 |

| day of week | weekday, holiday |
|---|---|
| time zone | 0:00~0:14, 0:15~0:29, 0:30~0:44, ..., 23:45~23:59 (15 minutes divisions) |
| staying cluster | 1a, 2a, 3a |

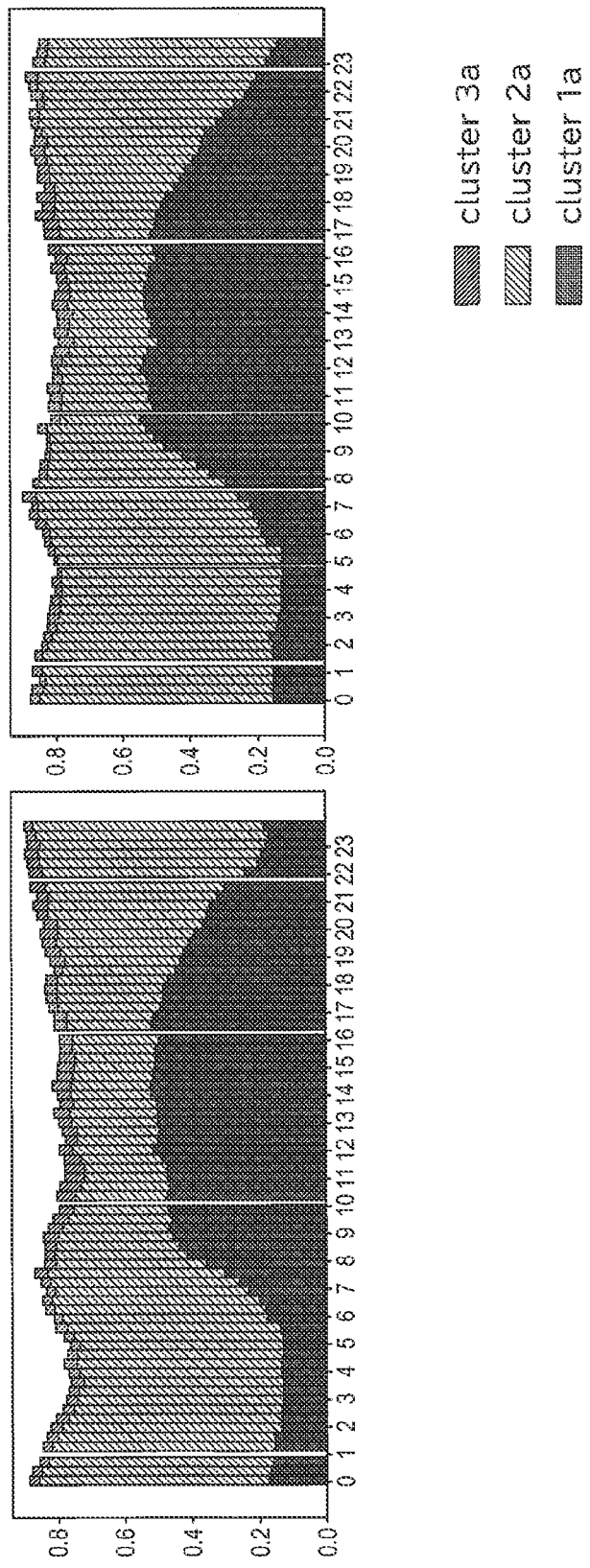

INFORMATION PROCESSING FOR SPECIFYING A VECTOR REPRESENTATION REPRESENTING A FEATURE OF A TEMPORAL USAGE PATTERN OF AN AREA

CROSS-REFERENCE TO RELATED APPLICATIONS

The present application claims priority under to Japanese Patent Application No. 2020-209558, filed Dec. 17, 2020. The contents of this application are incorporated herein by reference in their entirety.

TECHNICAL FIELD

The technology disclosed herein relates to an information processing apparatus, among others, for specifying a vector representation representing a feature of a temporal usage pattern of an area or a vector representation representing a feature of a temporal location pattern of a user.

BACKGROUND

In recent years, with the spread of mobile terminals equipped with a GPS (Global Positioning System) function (for example, smartphones, and wearable devices, among others), it has become easy to collect location information histories indicating location histories of each user. The location information history reflects the daily behavior of each user and can be utilized for various purposes such as congestion prediction, city planning, and marketing.

In order to actually utilize the location information history, it is necessary to model the location information history in accordance with the purpose. For example, as approaches for modeling a staying location transition of a user, there have been known a "coordinate transition model" that represents staying locations by coordinates (latitude and longitude) and a "label transition model" that represents staying locations by labels (for example, residential districts, restaurants, and the like). By modeling the location information history, the data can be abstracted and the meaning can be easily settled for each user.

As a technology related to the label transition model described above, there has been known a technology that creates a distributed representation of users by using a data set including various elements (for example, staying purpose, weather, means of transportation, and the like) and measures similarity of behaviors among users on the basis of the distributed representation. In addition, as a technology related to the label transition model described above, there has been known a technology that analogize the staying purpose of a user on the basis of previously collected POI (Point of Interest) information, creates a staying location transition model according to the staying purpose, and estimating the attribute of the user on the basis of the staying location transition model.

In the conventional technology described above, when the label indicates a type of POI, there is a problem that stores covering various categories such as clothing, daily necessities, and foods "cannot be uniquely labeled", and there is also a problem that POIs not registered in the data set in the first location "cannot be labeled". Further, in the conventional technology described above, when the label represents staying purposes (home, workplace, eating and drinking, entertainment, and the like), there is a problem that a large part of information is lost because the number of labels is several tens to several hundreds at most.

SUMMARY

An object of the present technology disclosed herein is to provide, as a model representing features of temporal usage patterns of areas or a model representing features of temporal location patterns of users, a specification of a model capable of being uniquely specified and holding as much various types of information as possible.

According to one aspect, an information processing apparatus specifies, on the basis of location information history data representing respective location information histories of a plurality of users, a vector representation representing features of respective temporal usage patterns of L areas (L is an integer greater than or equal to 2). The information processing apparatus includes a usage pattern data acquiring unit and an area vector representation specifying unit. The usage pattern data acquiring unit acquires, on the basis of the each of the location information history data, area-specific usage pattern data indicating which of M temporal usage patterns (M is an integer greater than or equal to 2) the temporal usage pattern of each of the users in each of the areas is. The area vector representation specifying unit specifies, on the basis of the area-specific usage pattern data, an N-dimensional vector representation (N is an integer greater than or equal to 2 and smaller than L and M) representing a feature of the temporal usage pattern of each of the areas.

According to another aspect, an information processing apparatus specifies, on the basis of location information history data representing respective location information histories of a plurality of users, a vector representation representing features of respective temporal location patterns of P users (P is an integer greater than or equal to 2). The information processing apparatus includes a location pattern data acquiring unit and a user vector representation specifying unit. The location pattern data acquiring unit acquires, on the basis of the location information history data, user-specific location pattern data indicating which of Q temporal location patterns (Q is an integer greater than or equal to 2) the temporal location pattern of each of the users is. The user vector representation specifying unit specifies, on the basis of the user-specific location pattern data, an R-dimensional vector representation (R is an integer greater than or equal to 2 and smaller than P and Q) representing a feature of the temporal location pattern of each of the users.

It should be noted that the technologies disclosed herein can be implemented in various forms such as an information processing apparatus, an information processing method, a computer program for implementing these methods, and a non-transitory recording medium on which the computer program is recorded, among other forms.

BRIEF DESCRIPTION OF THE DRAWINGS

FIG. 4 is an explanatory diagram illustrating an example of area-specific usage pattern data Da;

FIG. 5 is an explanatory diagram illustrating a classification of each item for specifying the staying pattern;

FIG. 13 is an explanatory diagram illustrating an example of user-specific location pattern data Du;

FIG. 14 is an explanatory diagram illustrating a classification of each item for specifying the temporal location pattern;

FIG. 20 is an explanatory diagram illustrating an example of an analysis result of a user cluster 5*u* specified by clustering.

DETAILED DESCRIPTION

A. Embodiment

Figure 1:
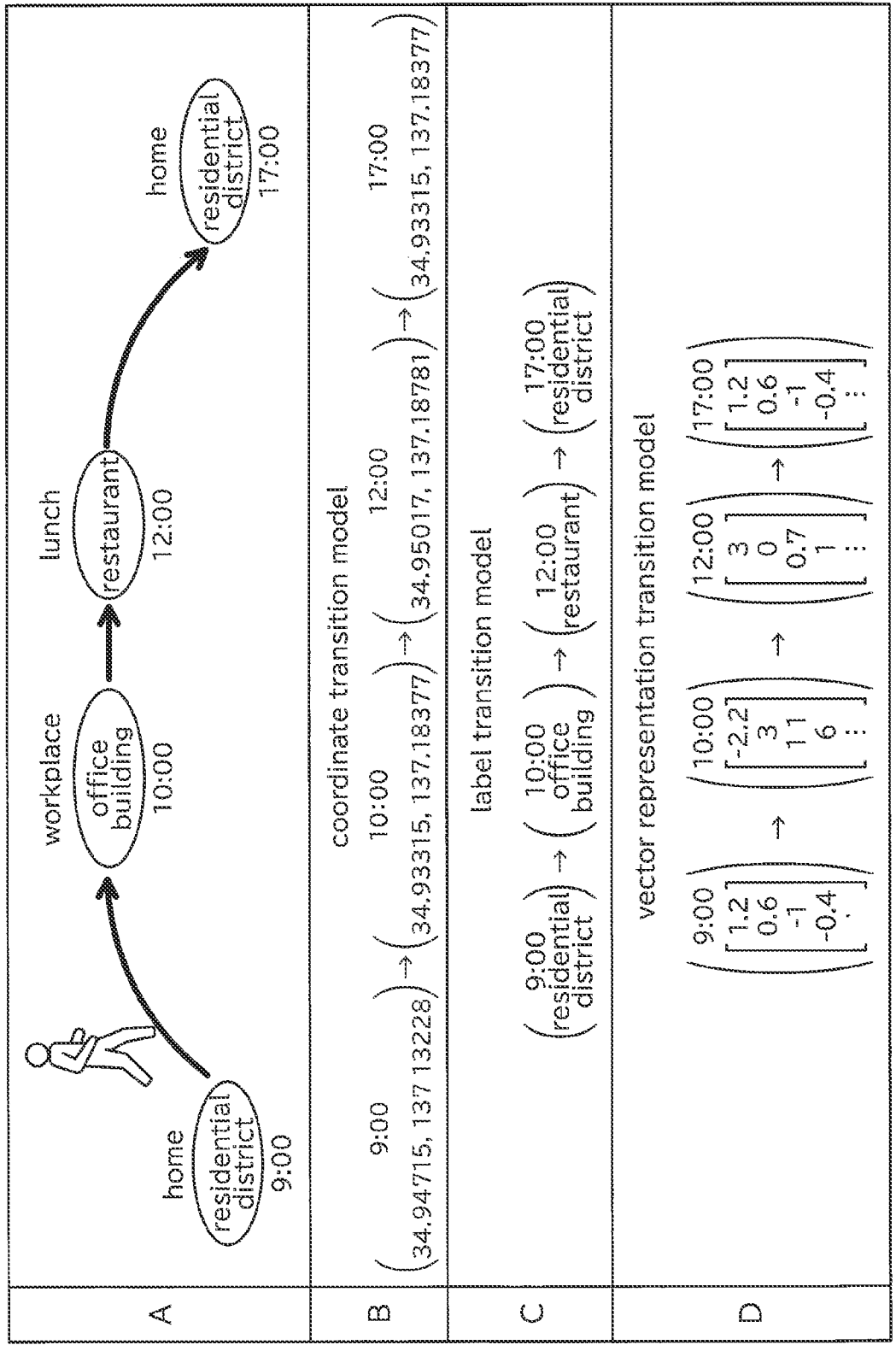
FIG. 1 is an explanatory diagram illustrating various models for representing a staying location transition of a user.

A-1. Various Models to Represent a Staying Location Transition of a User:

FIG. 1 is an explanatory diagram conceptually illustrating various models for representing a staying location transition of a user. Column A of FIG. 1 shows an example of the staying location transition of a user. In this example, the user leaves his or her home in a residential district at 9 o'clock, arrives at work in an office building at 10 o'clock, goes to a restaurant for lunch at 12 o'clock, and then goes back to the office and returns home in the residential district at 17 o'clock.

Column B of FIG. 1 illustrates an example of a coordinate transition model. In the coordinate transition model, the staying location of the user at each time point is represented by coordinates (latitude and longitude). Therefore, in the coordinate transition model, it is difficult to perform processing such as comparison of staying location transitions among a plurality of users.

Column C of FIG. 1 shows an example of a label transition model. In the label transition model, a staying location of a user at each time point is represented by a predetermined label (for example, residential districts, restaurants, and the like) commonly used among users. Therefore, in the label transition model, it is possible to perform processing such as comparison of staying location transitions among a plurality of users. However, in the label transition model, as described above, there are problems that the location "cannot be uniquely labeled" or "cannot be labeled", and that a large part of information is lost.

Column D of FIG. 1 shows an example of a vector representation transition model according to the technology disclosed herein. In the vector representation transition model, a staying location of a user at each time point is represented by a vector representation (distributed representation) of a predetermined number of dimensions representing features of temporal usage patterns (how the location is used with respect to time) of the location. According to the vector representation transition model, for example, comparison of staying location transitions among a plurality of users can be conducted by calculating a distance between vectors representing areas where each of the users has stayed. Further, according to the vector representation transition model, the vector representation representing the feature of the temporal usage pattern of each of the areas can be uniquely specified, and areas and users can be modeled in a form holding as much various types of information as possible. This point will be described in detail below.

Figure 2:
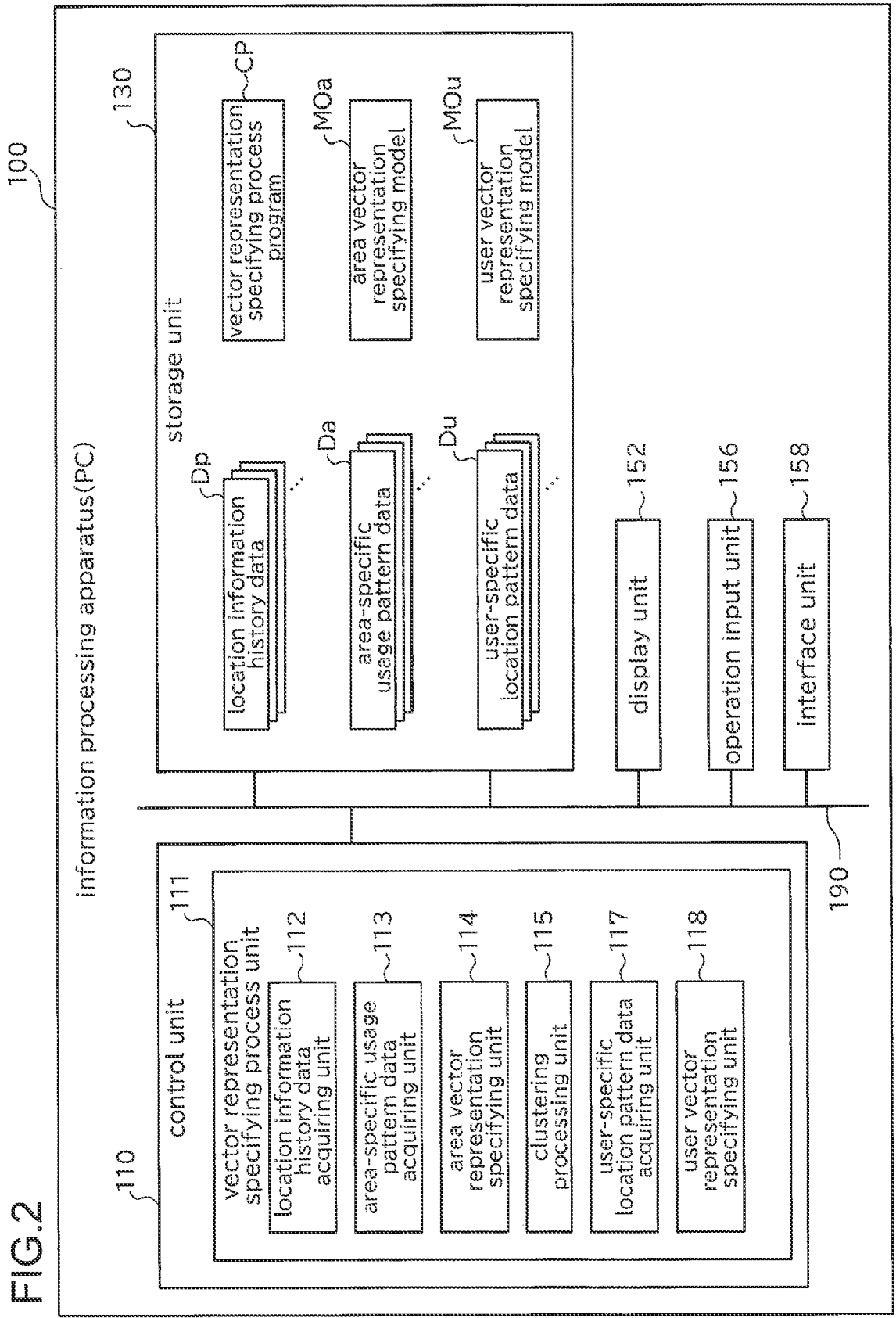
FIG. 2 is a block diagram illustrating a schematic configuration of an information processing apparatus 100 according to the present embodiment.

A-2. Configuration of Information Processing Apparatus 100:

FIG. 2 is a block diagram illustrating a schematic configuration of an information processing apparatus 100 according to the present embodiment. The information processing apparatus 100 of the present embodiment is an apparatus for performing vector representation specifying process for specifying a vector representation representing a feature of a temporal usage pattern of an area and a vector representation representing a feature of a temporal location pattern of a user.

The information processing apparatus 100 may be constituted by, for example, a personal computer (hereinafter, referred to as "PC"). The information processing apparatus 100 includes a control unit 110, a storage unit 130, a display unit 152, an operation input unit 156, and an interface unit 158. These units are communicatively connected to each other via a bus 190.

The display unit 152 of the information processing apparatus 100 is constituted by, for example, a liquid crystal display or the like, and displays various images and information. The operation input unit 156 is constituted by, for example, a keyboard, a mouse, a button, a microphone, and the like, and receives operations or instructions from an operator. The display unit 152 may be provided with a touch panel to function as the operation input unit 156. The interface unit 158 includes, for example, a LAN interface and a USB interface, and communicates with other devices through wired or wireless connection.

The storage unit 130 of the information processing apparatus 100 includes, for example, a ROM, a RAM, and a hard disk drive (HDD), stores various programs and data, and is used as a work area and a temporary data storage area when executing various programs. For example, the storage unit 130 stores a vector representation specifying process program CP, which is a computer program for executing the vector representation specifying process described above. The vector representation specifying process program CP is provided, for example, in a state of being stored in a computer-readable recording medium (not shown) such as a CD-ROM, a DVD-ROM, or a USB memory, and is installed in the information processing apparatus 100 to be stored in the storage unit 130.

In the vector representation specifying process, the storage unit 130 of the information processing apparatus 100 stores location information history data Dp, area-specific usage pattern data Da, user-specific location pattern data Du, area vector representation specifying model MOa, and user vector representation specifying model MOu. These data and models will be described in conjunction with the description of the vector representation specifying process described later.

The control unit 110 of the information processing apparatus 100 includes, for example, a CPU, and executes a computer program read from the storage unit 130 to control the operation of the information processing apparatus 100. For example, the control unit 110 reads the vector representation specifying process program CP from the storage unit 130 and executes it to perform the vector representation specifying process. More specifically, the control unit 110 functions as a vector representation specifying process unit 111 for executing the vector representation specifying process. The vector representation specifying process unit 111 includes a location information history data acquiring unit 112, an area-specific usage pattern data acquiring unit 113, an area vector representation specifying unit 114, a clustering processing unit 115, a user-specific location pattern data acquiring unit 117, and a user vector representation specifying unit 118. The functions of these units will be described in conjunction with the description of the vector representation specifying process described later. The area-specific usage pattern data acquiring unit 113 is an example of the usage pattern data acquiring unit in the claims, and the user-specific location pattern data acquiring unit 117 is an example of the location pattern data acquiring unit in the claims.

A-3. Vector Representation Specifying Process:

Next, a vector representation specifying process performed by the information processing apparatus 100 of the present embodiment will be described. The vector representation specifying process in the present embodiment includes an area vector representation specifying process for specifying a vector representation of an area and a user vector representation specifying process for specifying a vector representation of a user. Hereinafter, these will be described, respectively.

Figure 3:
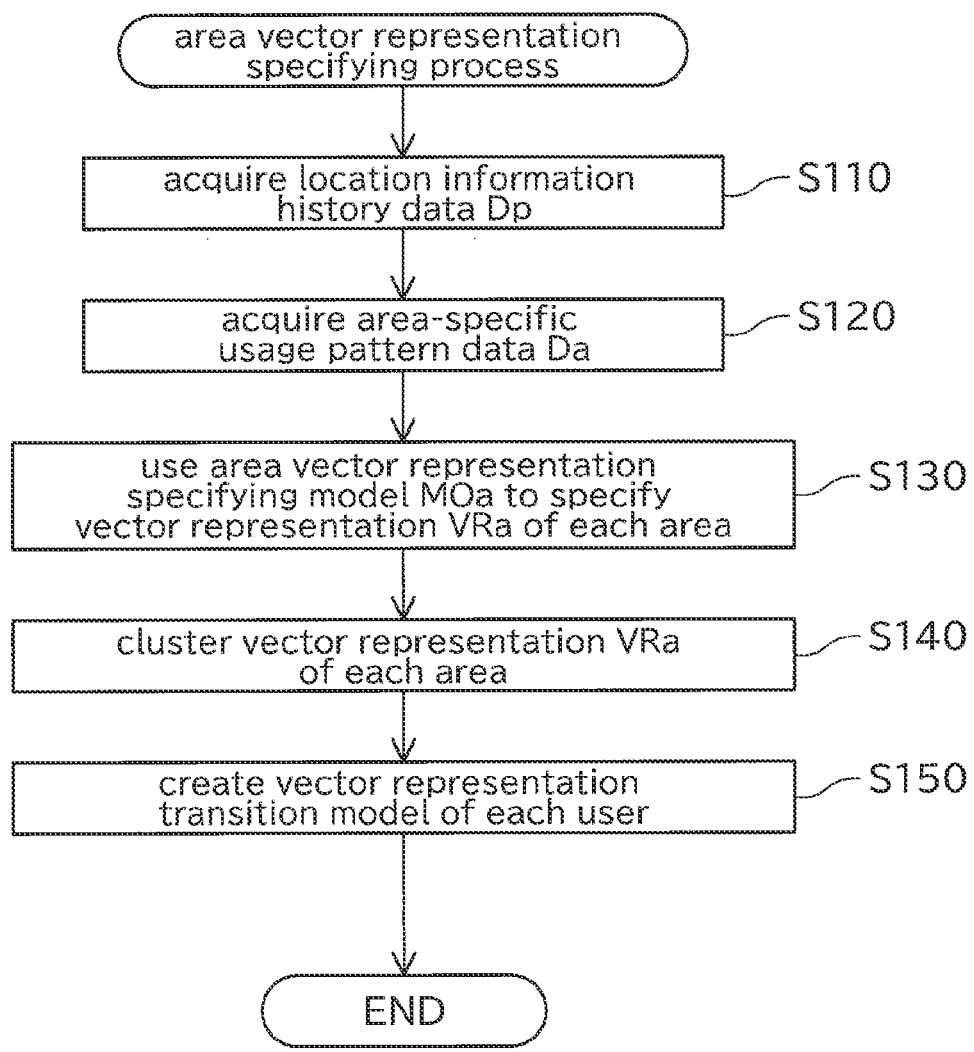
FIG. 3 is a flowchart illustrating an area vector representation specifying process in the present embodiment.

A-3-1. Area Vector Representation Specifying Process:

FIG. 3 is a flowchart illustrating the area vector representation specifying process in the present embodiment. The area vector representation specifying process is a process for specifying a vector representation VRa representing features of respective temporal usage patterns (how the location is used with respect to time) of L areas (L is an integer greater than or equal to 2). In the present embodiment, a staying pattern of each user in each area is used as a temporal usage pattern of each area. It should be noted that each area is defined, for example, by dividing a target range on a map into a plurality of meshes having a predetermined size (for example, 50 m in the east-west direction and 50 m in the north-south direction). The area vector representation specifying process is started, for example, in response to an instruction from an operator to start the process via the operation input unit 156 of the information processing apparatus 100.

First, the location information history data acquiring unit 112 of the information processing apparatus 100 (FIG. 2) acquires a plurality of the location information history data Dp indicating location information histories of plurality of users (S110 of FIG. 3). The location information history data Dp is data indicating a location of a user at each time point. Each location information history data Dp is generated by, for example, a mobile terminal (for example, smartphones, wearable devices, and the like) having a GPS function, collected by a server (not shown) capable of communicating with each mobile terminal, and acquired from the server via a communication line by a location information history data acquiring unit 112. The acquired location information history data Dp is stored in the storage unit 130.

Next, the area-specific usage pattern data acquiring unit 113 of the information processing apparatus 100 (FIG. 2) acquires area-specific usage pattern data Da (S120 of FIG. 3). The area-specific usage pattern data Da is data indicating which of M patterns (M is an integer of 2 or more, and in the present embodiment, M=144) the temporal usage patterns (staying pattern) of each user in each area is.

FIG. 4 is an explanatory diagram illustrating an example of the area-specific usage pattern data Da. As shown in FIG. 4, the area-specific usage pattern data Da includes data indicating a staying date attribute, a staying time point, and a staying time length. The staying date attribute is data indicating the attribute of the date on which a user stayed at a place. In the present embodiment, the staying date attribute may be classified by the day of the week (weekdays or holidays (here, holidays includes weekends and national holidays)). Other classification such as seasons and months may be used for the staying date attribute. The staying time point is data indicating the time zone of the day in which a user stayed at a place. In the present embodiment, an arrival time to each area (staying starting time point) is used as the index value of the staying time point. The departure time from each area (staying ending time point) or the central time of each stay in each area may be used as the staying time point. The staying time length is the elapsed time from the arrival time to the departure time in each area. For example, in the first row of the example of the area-specific usage pattern data Da shown in FIG. 4, it is shown that a certain user arrived in the area of the area ID:10 at 11:10 on a holiday and stayed in the area for 66 minutes from the arrival time. Further, in the second row of the example of the area-specific usage pattern data Da shown in FIG. 4, it is shown that a certain user (this user can be the same as or different from the user of the first row) arrived in the area of the area ID:23 at 8:30 on a weekday and stayed in the area for 360 minutes after the arrival time. The area-specific usage pattern data Da may include a plurality of data (records) for each area.

The area-specific usage pattern data Da is data for specifying the staying pattern by the combination of the staying date attribute (staying day of the week), the staying time point (arrival time), and the staying time length of each user in each area. FIG. 5 is an explanatory diagram illustrating a classification of each item for specifying the staying pattern. As shown in FIG. 5, in the present embodiment, 2 classifications of weekdays and holidays are defined for the staying day of the week, and 12 classifications of 2-hour divisions such as 0:00 to 1:59, 2:00 to 3:59 . . . are defined for the arrival time, and 6 classifications of the staying time length of 0 to 29 minutes, 30 to 59 minutes, 60 to 119 minutes, 120 to 239 minutes, 240 to 359 minutes, and 360 minutes or more are defined for the staying time length. Accordingly, 2 classifications (staying day of the week)×12 classifications (arrival time)×6 classifications (staying time length)=144 staying patterns can be specified. As shown in FIG. 4, the area-specific usage pattern data Da indicates which of the 144 staying patterns specified by a combination of the staying day of the week, the staying time point, and the staying time length the individual stay of each user in each area is.

The area-specific usage pattern data acquiring unit 113 may acquire the area-specific usage pattern data Da by generating the area-specific usage pattern data Da on the basis of the location information history data Dp. Alternatively, the area-specific usage pattern data acquiring unit 113 may acquire the area-specific usage pattern data Da generated by another device (for example, a server) on the basis of the location information history data Dp from the other device, for example, via a communication line. In this case, the process of acquiring the location information history data Dp (S110 of FIG. 3) may be omitted.

Next, the area vector representation specifying unit 114 of the information processing apparatus 100 (FIG. 2) performs a machine learning by using the area vector representation specifying model MOa to specify the vector representation VRa of each area (S130 of FIG. 3).

Figure 6:
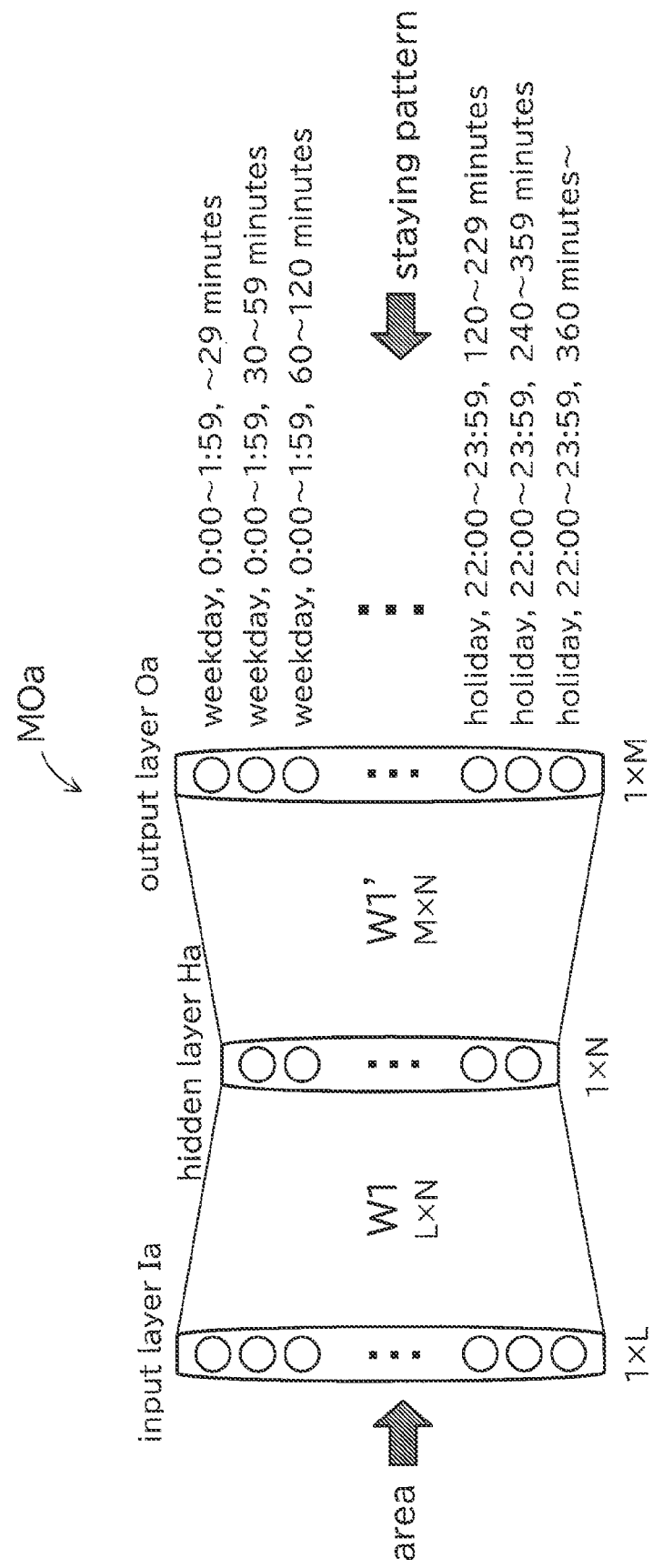
FIG. 6 is an explanatory diagram illustrating an example of an area vector representation specifying model Moa.

FIG. 6 is an explanatory diagram illustrating an example of the area vector representation specifying model MOa. In the present embodiment, a modified version of the Skip-gram model of Word2Vec is used as the area vector representation specifying model MOa. The Word2Vec is a neural network for text processing developed in the field of natural language processing. In the Word2Vec Skip-gram model, a certain word is input, a task to predict words around the certain word is learned by a neural network, and the weight (row corresponding to each word in the weighting matrix indicating weights from the input layer to the hidden layer) of the middle layer obtained is specified as a vector representation (distributed representation) of each word. In the vector space of words obtained by Word2Vec, words that frequently appear in close locations in texts are arranged close to each other, and words that infrequently appear in close locations in texts are arranged far from each other.

As shown in FIG. 6, the area vector representation specifying model MOa is a three-layer neural network having an L-dimensional input layer Ia, an M-dimensional output layer Oa, and an N-dimensional hidden layer Ha (N is an integer greater than or equal to 2 and smaller than L and M). In the present embodiment, the number of dimensions N of the hidden layer Ha is 50. The input to the input layer Ia is an L-dimensional One-hot vector (a vector in which the element corresponding to the area is 1 and all other elements are 0) that specifies one of the L areas. The output from the output layer Oa is an M-dimensional One-hot vector (a vector in which the element corresponding to the staying pattern is 1 and all other elements are 0) that specifies one of the M staying patterns indicated by the area-specific usage pattern data Da for the area specified in the input. For example, in accordance with the example of the first row of the area-specific usage pattern data Da shown in FIG. 4, the present embodiment uses learning data having a One-hot vector specifying the area of the area ID:10 as the input and a One-hot vector specifying the staying pattern of the staying pattern ID:105 as the output.

The area vector representation specifying unit 114 uses the area vector representation specifying model MOa having such a configuration to perform a machine learning in which each data defined in the area-specific usage pattern data Da is used as learning data, thereby specifying an L×N weighting matrix W1 indicating weights from the input layer Ia to the hidden layer Ha. Then, the row corresponding to each area in the weighting matrix W1 (the row corresponding to the element flagged with "1" in the One-hot vector specifying each area) is specified as the N-dimensional vector representation VRa representing the feature of the staying pattern in each area. The vector representation VRa of each area specified in this way represents a feature such as on which kind of date (day of the week), in which time zone, and how long a person tends to stay in the area. Therefore, in the space of the vector representation VRa of each area, areas having similar staying patterns are arranged close to each other, and areas having significantly different staying patterns are arranged far from each other.

Next, the clustering processing unit 115 of the information processing apparatus 100 (FIG. 2) clusters the vector representation VRa of each area (S140 of FIG. 3). By classifying the vector representation VRa of each area into a plurality of clusters (area clusters) by clustering, areas having similar staying patterns are grouped into the same cluster. By analyzing the information of each cluster, the feature of the staying pattern of the area belonging to each cluster can be interpreted. It should be noted that any clustering method such as k-means can be used for this clustering. The number of clusters is a hyperparameter and can be arbitrarily set.

Figure 7:
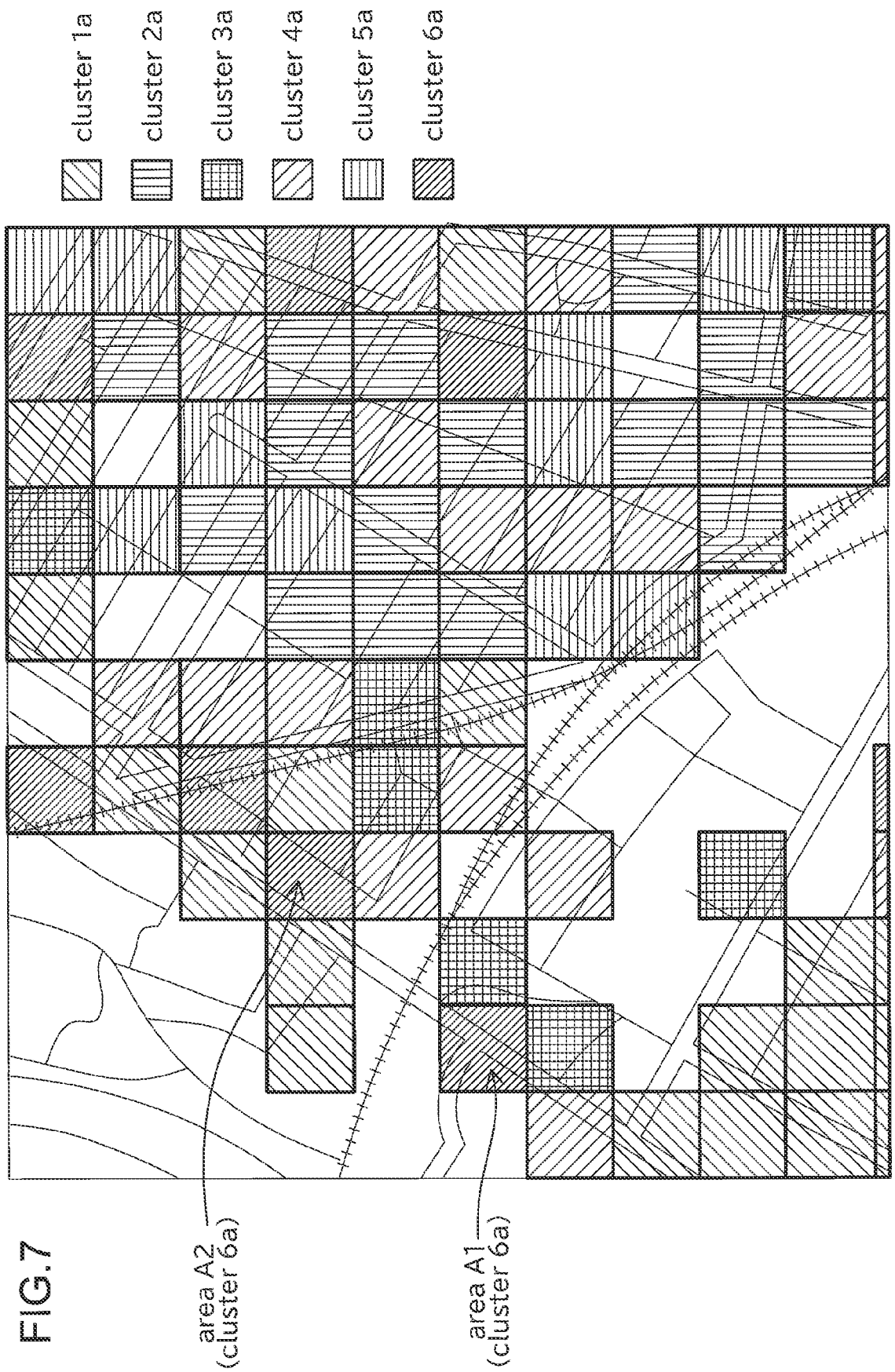
FIG. 7 is an explanatory diagram illustrating an example of clustering results of the vector representation VRa of each area.

FIG. 7 is an explanatory diagram illustrating an example of the clustering result of the vector representation VRa of each area. FIG. 7 illustrates a result of clustering processing for classifying a plurality of areas into 6 area clusters (clusters 1a to 6a). For example, it is expected that the area A1 shown in FIG. 7 belonging to the cluster 6a has a similar staying pattern with the area A2 also belonging to the cluster 6a. In FIG. 7, areas not hatched are areas where the vector representation VRa was not specified because the amount of data was insufficient.

Figure 8:
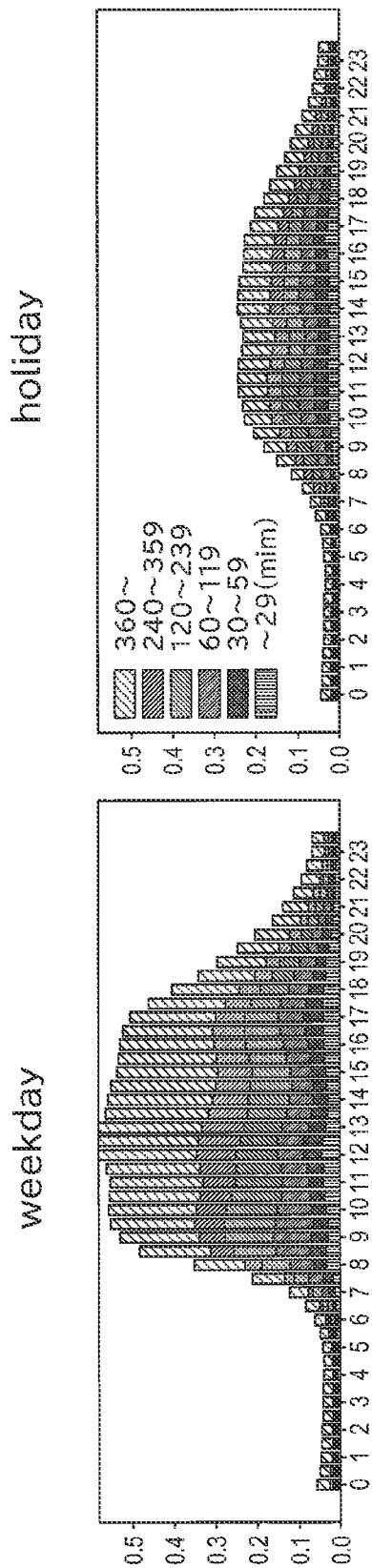
FIG. 8 is an explanatory diagram illustrating an example of an analysis result of an area cluster 1*a*.
Figure 9:
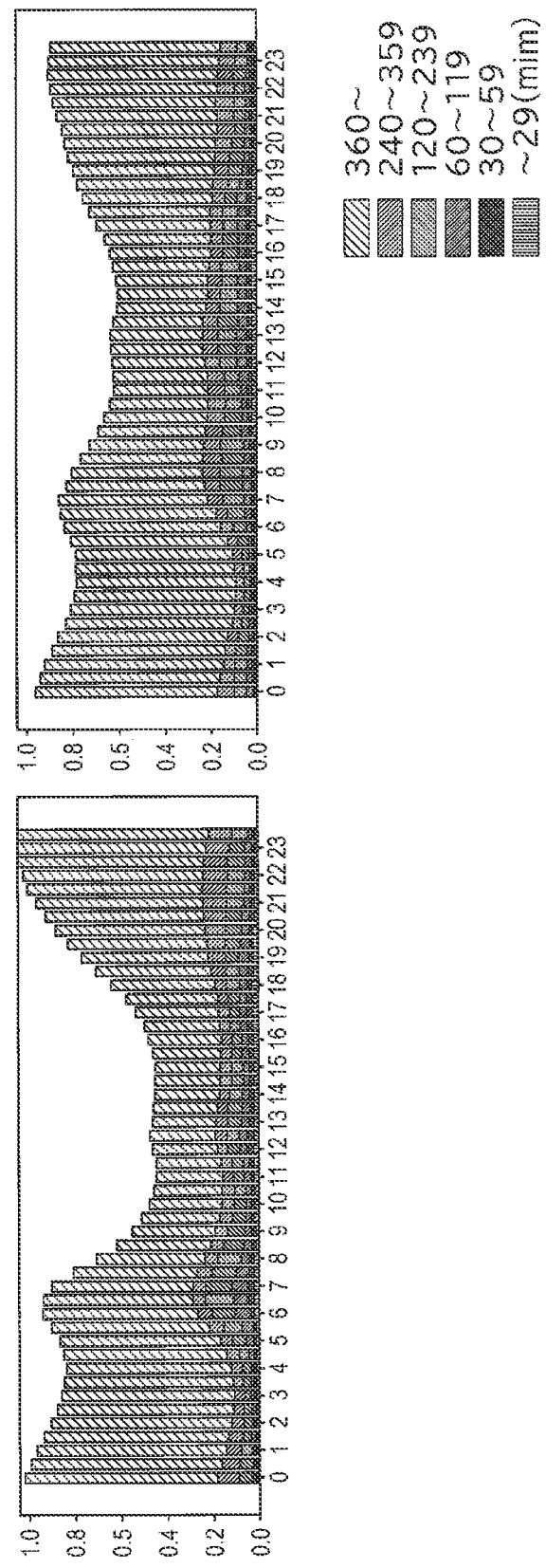
FIG. 9 is an explanatory diagram illustrating an example of an analysis result of an area cluster 2*a*.
Figure 10:
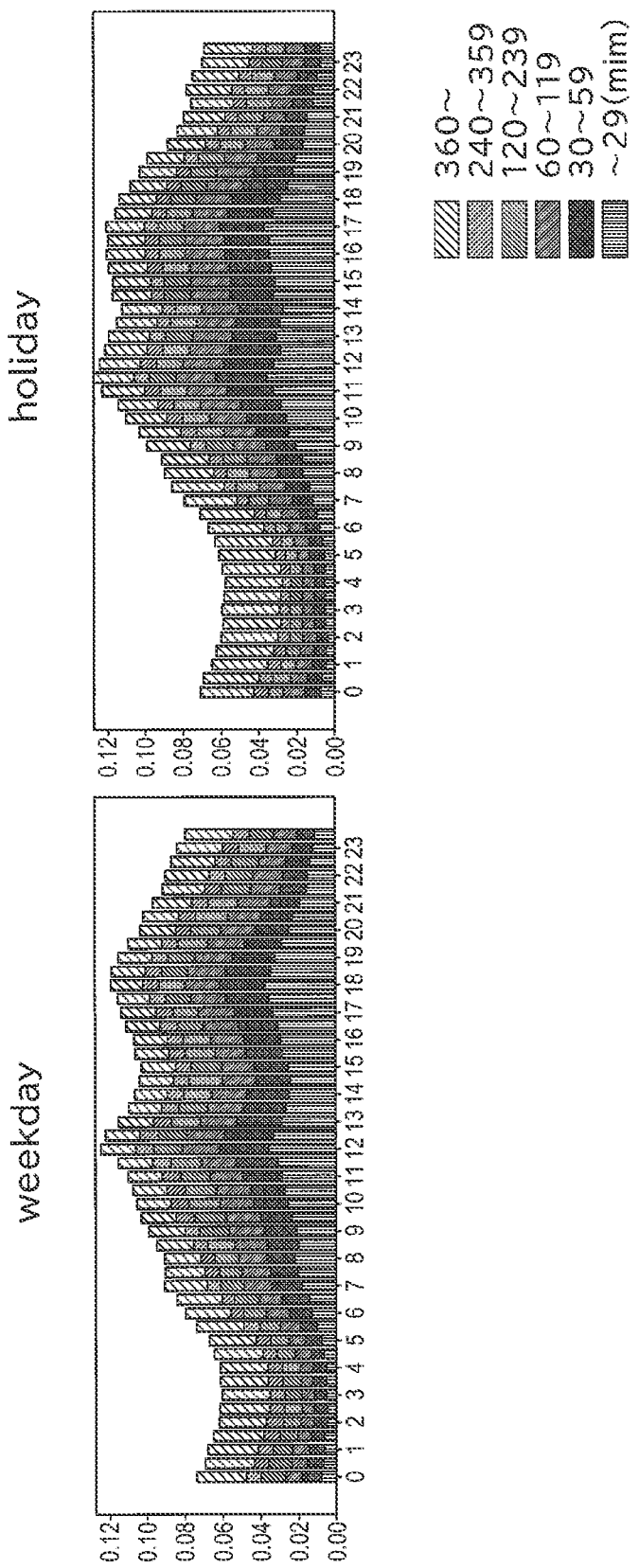
FIG. 10 is an explanatory diagram illustrating an example of an analysis result of an area cluster 3*a*.

FIGS. 8 to 10 are explanatory diagrams showing examples of the analysis result of each of the area clusters. FIGS. 8 to 10 respectively illustrate, as results of clustering processing for classifying a plurality of areas into 3 area clusters (clusters 1a to 3a), the distributions of the number of persons for one area belonging to each cluster per day of weekdays and holidays with respect to staying time length. The vertical axis represents the number of persons, the horizontal axis represents time, and the bins of the horizontal axis are 30 minutes. In FIGS. 8 to 10, a person staying for a long time is counted over a plurality of time zones. For example, persons who stay from 10 o'clock to 12 o'clock are counted in all bins from 10 o'clock to 12 o'clock.

The cluster 1a shown in FIG. 8 is interpreted as a "business district". The reasons are as follows.
According to the graph of weekdays, many persons starts to stay for a long time from around 8:00 AM, and few persons stayed at night.
According to the graph of holidays, the number of persons staying is extremely small.

The cluster 2a shown in FIG. 9 is interpreted as "residential district". The reasons are as follows.
Long stays are noticeable throughout the day.
There is not much difference between weekdays and holidays.

Further, the cluster 3a shown in FIG. 10 is interpreted as "others", that is, a "shopping district" or "restaurant district" which is an area other than a business district and a residential district, or a "station" through which people pass irregularly. The reasons are as follows.
There are many short stays.
The number of staying persons increases during meal times.
The number of persons staying at night is large to some extent.

Thus, each area cluster includes information relating to staying in the area belonging to the area cluster, and by analyzing this information, the feature of each area can be analyzed to some extent. Therefore, it can be said for the vector representation VRa that the closeness among the vector representations VRa for respective areas is determined in accordance with the temporal feature relating to staying.

The analysis results shown in FIGS. 8 to 10 were obtained by collecting GPS data of 5,823 users in Nisshin City, Aichi Prefecture, Japan in March 2020 (12,350,583 records), dividing the whole city into 50 m meshes into 28,000 areas, and analyzing 4,821 areas for which a sufficient amount of data for learning were obtained. In the area vector representation specifying model MOa, the number of dimensions L of the input layer Ia is 4,821, the number of dimensions M of the output layer Oa is 144, and the number of dimensions N of the hidden layer Ha is 50.

It should be noted that the clustering processing unit 115 of the information processing apparatus 100 (FIG. 2) may specify a vector representation representing the feature of the staying pattern of each area cluster after the clustering processing. For example, the clustering processing unit 115 may calculate the average of the respective vector representations VRa of areas belonging to each area cluster and set the average as the vector representation of each area cluster.

Figure 11:
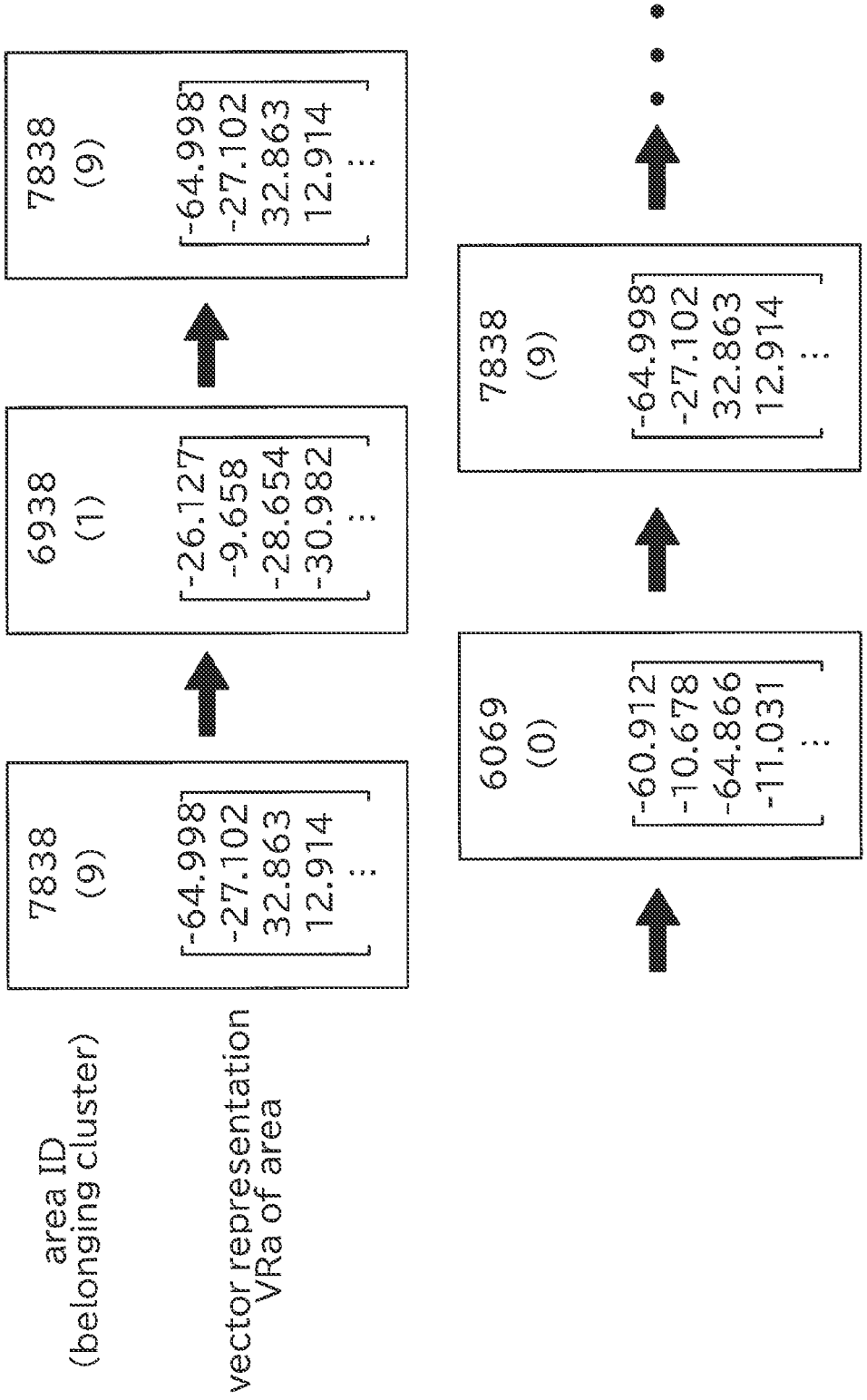
FIG. 11 is an explanatory diagram illustrating an example of a vector representation transition model.

Next, the vector representation specifying process unit 111 of the information processing apparatus 100 (FIG. 2) creates a vector representation transition model for the staying location transition of each user (S150 of FIG. 3). FIG. 11 is an explanatory diagram illustrating an example of a vector representation transition model. The vector representation transition model of a user is a model which represents the staying area of each user at each time point by the vector representation VRa of the area. In the example shown in FIG. 11, the user starts from an area having an area ID:7838 (belonging cluster:9), and transits the staying location in the order of an area having an area ID:6938 (belonging cluster:1), an area having an area ID:7838 (belonging cluster:9), an area having an area ID:6096 (belonging cluster:0), and an area having an area ID:7838 (belonging cluster:9) . . . , and the staying transitions are represented by vector representations VRa of respective staying areas. By using the vector representation transition model, for example, comparison of staying location transitions among a plurality of users can be performed on the basis of the distance between the vector representations VRa of each of the areas where each of the users stayed. Further, the vector representation transition model does not cause the problem that the location "cannot be uniquely labeled" or "cannot be labeled" as in the label transition model described above and can implement a modeling of the staying location transition of the user holding as much various types of information as possible.

Figure 12:
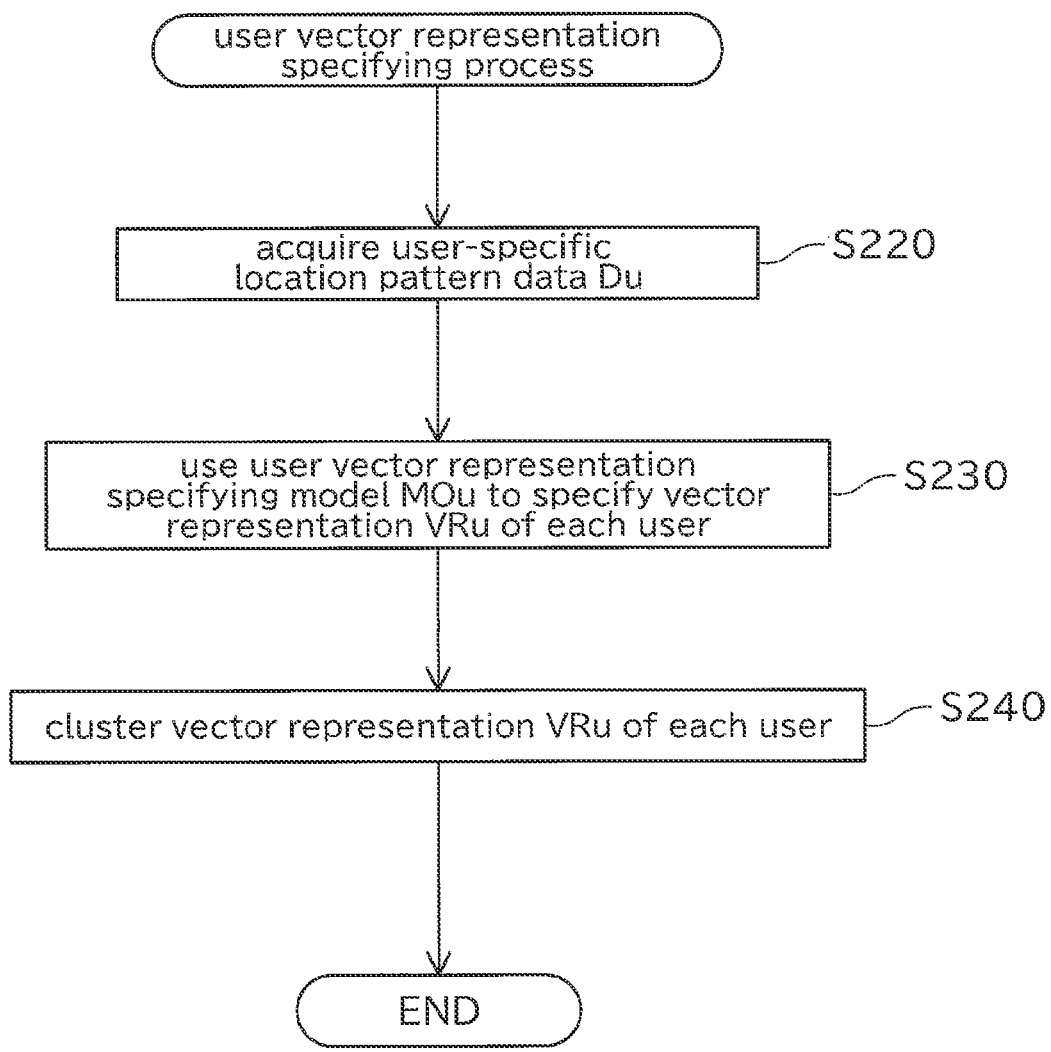
FIG. 12 is a flowchart illustrating a user vector representation specifying process according to the present embodiment.

A-3-2. User Vector Representation Specifying Process:

Next, a user vector representation specifying process for specifying a user vector representation will be described. FIG. 12 is a flowchart illustrating the user vector representation specifying process in the present embodiment. The user vector representation specifying process is a process for specifying a vector representation VRu representing the feature of each temporal location pattern (the pattern indicating where the user locates in a certain time zone in a certain date, in other words, the lifestyle of each user) of P users (P is an integer greater than or equal to 2). The user vector representation specifying process is started, for example, in response to an instruction for starting the process input by an operator via the operation input unit 156 of the information processing apparatus 100.

First, the user-specific location pattern data acquiring unit 117 of the information processing apparatus 100 (FIG. 2) acquires the user-specific location pattern data Du (S220 of FIG. 12). The user-specific location pattern data Du is data indicating which of Q patterns (Q is an integer of 2 or more, and in the present embodiment, Q=576) the temporal location pattern of each user is.

FIG. 13 is an explanatory diagram illustrating an example of the user-specific location pattern data Du. As shown in FIG. 13, the user-specific location pattern data Du includes data indicating a staying date attribute, a staying time zone, and a staying location. The staying date attribute is data indicating the attribute of the date on which a user stayed at a place. In the present embodiment, the staying date attribute may be classified by the day of the week (weekdays or holidays (weekends and national holidays)). Other classification such as seasons and months may be used for the staying date attribute. The staying time zone is data indicating the time zone of the day during which the user stayed. The staying location is data indicating the location of the user. In the present embodiment, the area cluster specified in the above-described area vector representation specifying process is used as the classification of the staying location. For example, in the first row of the example of the user-specific location pattern data Du shown in FIG. 13, it is shown that the user with the user ID:1 is located (stayed) in the cluster 1*a* from 0:00 to 0:14 on a holiday.

The user-specific location pattern data Du is data for specifying the temporal location pattern by the combination of the time (day of the week), the time zone, and the staying location (staying cluster) of each user. FIG. 14 is an explanatory diagram illustrating a classification of each item for specifying the temporal location pattern. As shown in FIG. 14, in the present embodiment, 2 classifications of weekdays and holidays are defined for the days of the week, 96 classifications of 15-minute divisions such as 0:00 to 0:14, 0:15 to 0:29 . . . are defined for the time zones, and 3 classifications of clusters 1*a* to 3*a* are defined for the staying clusters. Accordingly 2 classifications (day of the week)×96 classifications (time zone)×3 classifications (staying cluster) =576 temporal location patterns can be specified. As shown in FIG. 13, the user-specific location pattern data Du indicates which of the 576 temporal location patterns specified by a combination of the day of the week, the time zone, and a staying cluster the temporal location pattern of each user is.

The user-specific location pattern data acquiring unit 117 may acquire the user-specific location pattern data Du by generating the user-specific location pattern data Du on the basis of the location information history data Dp. Alternatively, the user-specific location pattern data acquiring unit 117 may acquire the user-specific location pattern data Du from another device (for example, a server) that generates the user-specific location pattern data Du on the basis of the location information history data Dp, for example, via a communication line.

Next, the user vector representation specifying unit 118 of the information processing apparatus 100 (FIG. 2) performs a machine learning by using the user vector representation specifying model MOu to specify the vector representation VRu of each user (S230 of FIG. 12).

Figure 15:
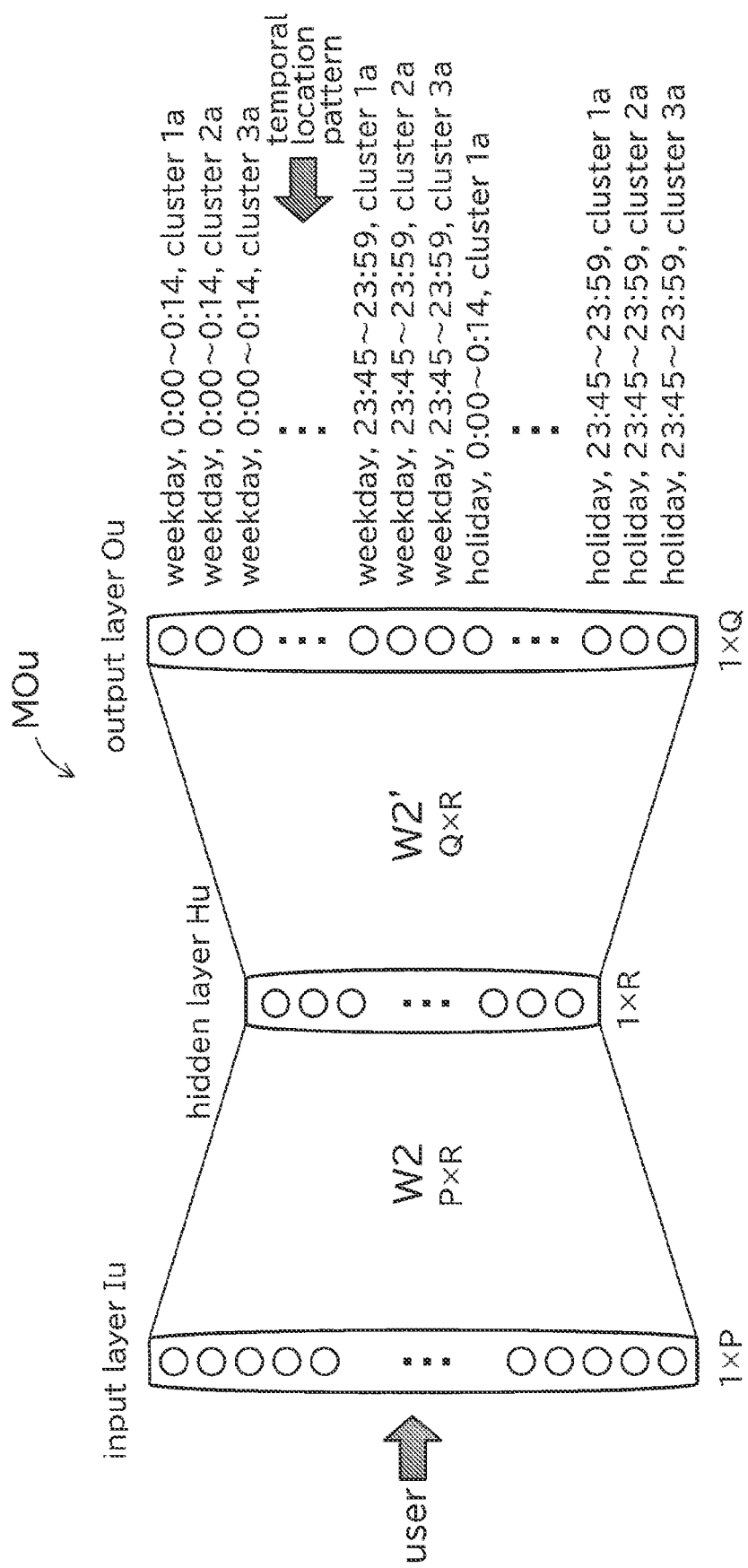
FIG. 15 is an explanatory diagram illustrating an example of a user vector representation specifying model MOu.

FIG. 15 is an explanatory diagram illustrating an example of the user vector representation specifying model MOu. In the present embodiment, as in the case of the area vector representation specifying model MOa, a modified version of the Skip-gram model of Word2Vec is used as the user vector representation specifying model MOu. As shown in FIG. 15, the user vector representation specifying model MOu is a three-layer neural network having a P-dimensional input layer Iu, a Q-dimensional output layer Ou, and an R-dimensional hidden layer Hu (R is an integer greater than or equal to 2 and smaller than P and Q). In the present embodiment, the dimension number R of the hidden layer Hu is 50. The input to the input layer Iu is a P-dimensional One-hot vector (a vector in which the element corresponding to the user is 1 and all other elements are 0) that specifies one of the P users. The output from the output layer Ou is a Q-dimensional One-hot vector (a vector in which the element corresponding the pattern is 1 and all other elements are 0) that specifies one of the Q temporal location patterns indicated by the user-specific location pattern data Du for the user specified in the input. For example, in accordance with the example of the first row of the user-specific location pattern data Du shown in FIG. 13, the present embodiment uses learning data having a One-hot vector specifying the user of the user ID:1 as the input and a One-hot vector specifying the temporal location pattern of the temporal location pattern ID:289 as the output.

The user vector representation specifying unit 118 uses the user vector representation specifying model MOu having such a configuration to perform a machine learning in which each data defined in the user-specific location pattern data Du is used as learning data, thereby specifying a P×R weighting matrix W2 indicating weights from the input layer Iu to the hidden layer Hu. Then, the row corresponding to each user in the weighting matrix W2 (the row corresponding to the element flagged with "1" in the One-hot vector specifying each user) is specified as the R-dimensional vector representation VRu representing the feature of the temporal location pattern of each user. The vector representation VRu of each user specified in this way represents the feature of in which kind of date (day of the week), in which time zone, and in which location each user tends to stay. Therefore, in the space of the vector representation VRu of each user, users having similar temporal location patterns are arranged close to each other, and users having significantly different temporal location patterns are arranged far from each other.

Next, the clustering processing unit 115 of the information processing apparatus 100 (FIG. 2) clusters the vector representation VRu of each user (S240 of FIG. 12). By classifying the vector representation VRu of each user into a plurality of clusters (user cluster) by clustering, users having similar temporal location patterns are grouped into the same cluster. By analyzing the information of each cluster, the feature of the temporal location pattern of the users belonging to each cluster can be interpreted. It should be noted that any clustering method such as k-means can be used for this clustering. The number of clusters is a hyper-parameter and can be arbitrarily set.

FIGS. 16 to 20 are explanatory diagrams showing examples of the analysis result of each of the user clusters specified by clustering. FIGS. 16 to 20 respectively illustrate, as a result of clustering processing for classifying a plurality of users into 5 user clusters (clusters 1u to 5u), the distribution of the number of staying counts for one user belonging to each cluster per day of weekdays and holidays with respect to the area cluster described above. The vertical axis represents the number of counts (15 minutes/count), the horizontal axis represents time, and the bins of the horizontal axis are 30 minutes. As described above, in the area clusters, the cluster 1a is interpreted as a business district, the cluster 2a is interpreted as a residential district, and the cluster 3a is interpreted as others.

Figure 16:
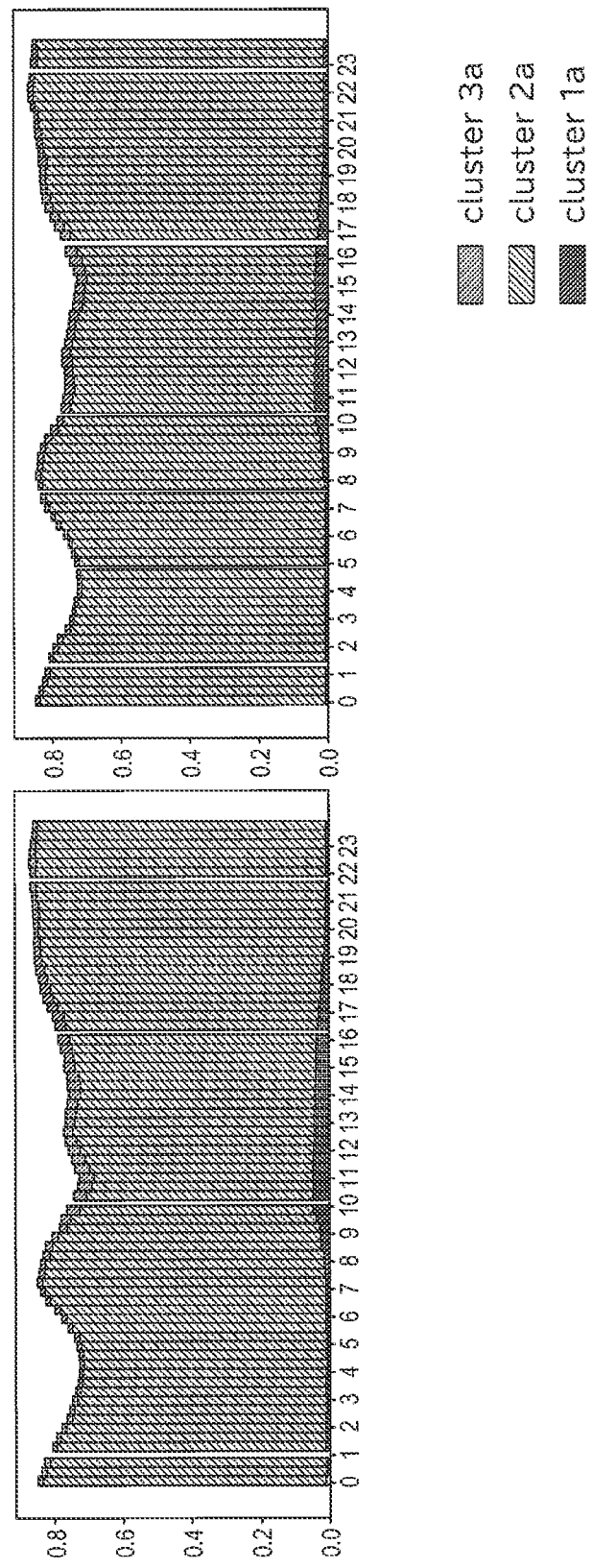
FIG. 16 is an explanatory diagram illustrating an example of an analysis result of a user cluster 1*u* specified by clustering.

The users belonging to the cluster 1u shown in FIG. 16 are likely to be teleworkers (remote workers) and/or house wives (or house husbands). The reasons are as follows.

Most users belonging to this cluster spend most of their time in the cluster 2a (residential district), both on weekdays and holidays.

Figure 17:
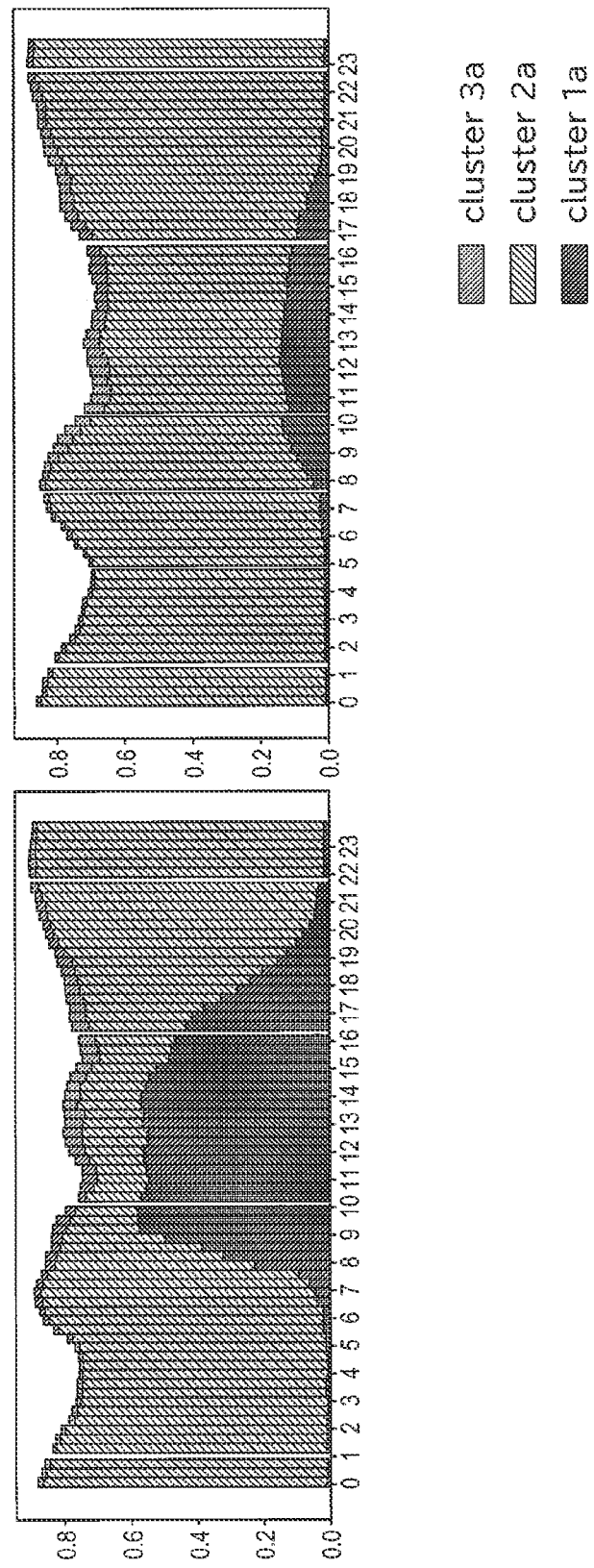
FIG. 17 is an explanatory diagram illustrating an example of an analysis result of a user cluster 2*u* specified by clustering.

Further, the users belonging to the cluster 2u shown in FIG. 17 are likely to be normal office workers commuting between home and office. The reasons are as follows.

The users belonging to this cluster often spend all day on weekdays in the cluster 1a (business district).

On the other hand, on holidays, the number of counts of the cluster 1a (business district) greatly decreases.

Figure 18:
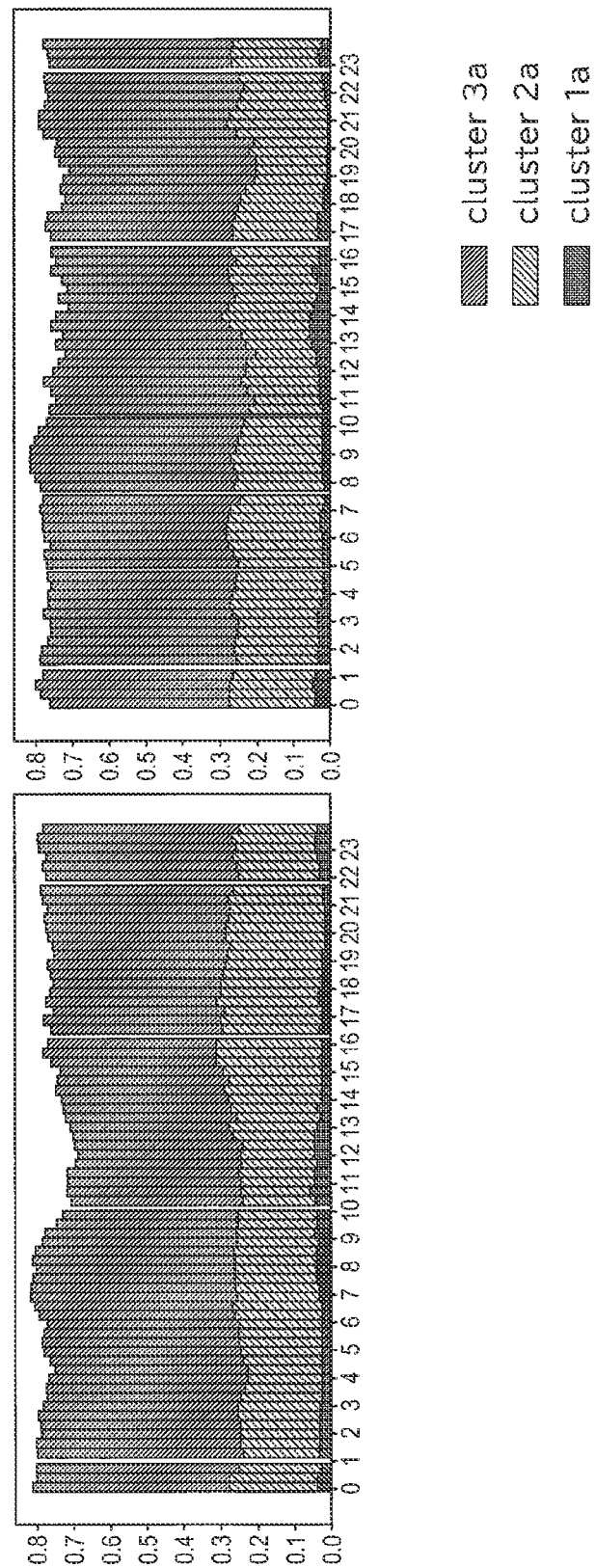
FIG. 18 is an explanatory diagram illustrating an example of an analysis result of a user cluster 3*u* specified by clustering.

Further, it can be estimated that the users belonging to the cluster 3u shown in FIG. 18 are users having a home in the cluster 3a (others) or part-time workers. The reasons are as follows.

The users belonging to this cluster spend a lot of time in the cluster 3a (others) regardless of the day of the week or the time point of the day.

Figure 19:
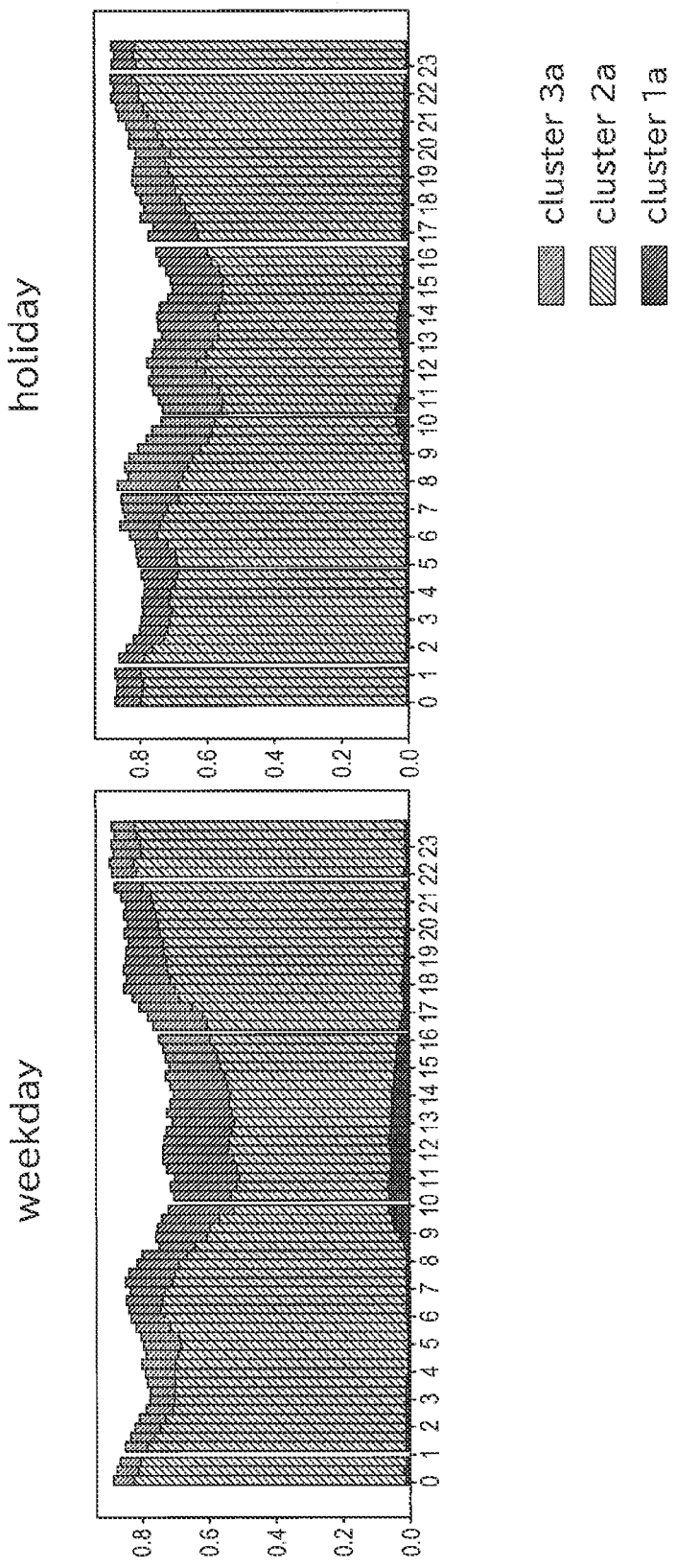
FIG. 19 is an explanatory diagram illustrating an example of an analysis result of a user cluster 4*u* specified by clustering.

Further, it can be estimated that the users belonging to the cluster 4u shown in FIG. 19 are teleworkers (remote workers) who go out frequently. The reasons are as follows.

Most users belonging to this cluster spend most of their time in the cluster 2a (residential district), both on weekdays and holidays.

However, compared with the users belonging to the cluster 1u, the users belonging to this cluster visit the cluster 3a (others) more frequently.

Further, it can be estimated that the users belonging to the cluster 5u shown in FIG. 20 are users having many opportunities to work on holidays. The reasons are as follows.

The users belonging to this cluster frequently visit the cluster 1a (business district) not only on weekdays but also on holidays.

Thus, each user cluster includes information relating to the temporal location pattern, or in other words, information relating to lifestyles of the users belonging to each user cluster, and by analyzing this information, the feature of each user can be analyzed to some extent. Therefore, it can be said for the vector representation VRu that the closeness among the respective vector representations VRu for respective users is determined in accordance with the feature of the temporal location pattern.

The analysis results shown in FIGS. 16 to 20 were obtained by using the same target area and data as the analysis of the area cluster shown in FIGS. 8 to 10. However, the analysis was conducted for 632 users for whom the staying locations in the time zones of 70% or more of a day could be specified. In the user vector representation specifying model MOu, the number of dimensions P of the input layer Iu is 632, the number of dimensions Q of the output layer Ou is 576, and the number of dimensions R of the a hidden layer Hu is 50.

It should be noted that the clustering processing unit 115 of the information processing apparatus 100 (FIG. 2) may specify a vector representation representing the feature of the temporal location pattern of each user cluster after the clustering processing. For example, the clustering processing unit 115 may calculate the average of the respective vector representations VRu of users belonging to the respective user clusters and set the average as the vector representation of each user cluster.

Further, the vector representation specifying process unit 111 of the information processing apparatus 100 may perform various types of processing by using the results of the area vector representation specifying process and the user vector representation specifying process described above. For example, the vector representation specifying process unit 111 can specify the degree of diversity of the users staying in each area by analyzing, for each area, the user cluster to which each user staying in the area belongs.

A-4. Effects of the Present Embodiment:

As described above, the information processing apparatus 100 of the present embodiment is an apparatus for specifying the vector representation VRa representing features of respective temporal usage patterns of L areas (L is an integer greater than or equal to 2) on the basis of the location information history data Dp representing respective location information histories of a plurality of users. The information processing apparatus 100 includes the area-specific usage pattern data acquiring unit 113 and the area vector representation specifying unit 114. The area-specific usage pattern data acquiring unit 113 acquires, on the basis of the each of the location information history data Dp, the area-specific usage pattern data Da indicating which of M temporal usage patterns (M is an integer greater than or equal to 2) the temporal usage pattern of each user in each area is. The area vector representation specifying unit 114 uses an area vector representation specifying model MOa, which is a three-layer neural network having an L-dimensional input layer $1a$, an M-dimensional output layer Oa, and an N-dimensional hidden layer Ha (N is an integer greater than or equal to 2 and smaller than L and M) to perform a machine learning in which an L-dimensional One-hot vector specifying one of the L areas is input to the input layer $1a$, and for the area specified in the input, an M-dimensional One-hot vector specifying the temporal usage pattern indicated by the area-specific usage pattern data Da is output from the output layer Oa, thereby specifying the row corresponding to each of the areas in an L×N weighting matrix W1 indicating weights from the input layer $1a$ to the hidden layer Ha as the N-dimensional vector representation VRa representing a feature of the temporal usage pattern of each area.

Thus, in the information processing apparatus 100 of the present embodiment, by performing the machine learning using the area vector representation specifying model MOa on the basis of the area-specific usage pattern data Da indicating which of M temporal usage patterns the temporal usage pattern of each user in each area is, the N-dimensional vector representation VRa representing the feature of the temporal usage pattern of each area can be specified. Therefore, according to the information processing apparatus 100 of the present embodiment, it is possible to implement, as a model representing the feature of the temporal usage pattern, a model capable of being uniquely specified and holding as much various types of information as possible. Further, according to the information processing apparatus 100 of the present embodiment, since it is not necessary to collect the POI information in advance or to manually label the POI, it is possible to reduce the labor and cost for modeling the areas.

In addition, the information processing apparatus 100 of the present embodiment further includes the clustering processing unit 115 for classifying the vector representation VRa specified for each area into a plurality of clusters. Therefore, according to the information processing apparatus 100 of the present embodiment, each area can be classified into a plurality of clusters on the basis of the similarity of the temporal usage pattern, and the feature of the area belonging to each cluster can be interpreted by analyzing each cluster.

Further, in the information processing apparatus 100 of the present embodiment, the temporal usage pattern of each area is a staying pattern of each user in each area. Therefore, according to the information processing apparatus 100 of the present embodiment, it is possible to implement, as a model representing the feature of a staying pattern of each area such as a staying tendency of a person staying in each area, a model capable of being uniquely specified and holding as much various types of information as possible.

Further, in the information processing apparatus 100 of the present embodiment, the area-specific usage pattern data Da is data for specifying the staying pattern by the combination of at least the staying date attribute, the staying time point, and the staying time length of each user in each area. Therefore, according to the information processing apparatus 100 of the present embodiment, it is possible to implement, as a model representing the feature of a staying pattern of each area such as on which kind of date, in which time zone, and how long a person tends to stay in each area, a model capable of being uniquely specified and holding as much various types of information as possible.

In addition, the information processing apparatus 100 of the present embodiment further includes the user-specific location pattern data acquiring unit 117 and the user vector representation specifying unit 118. The user-specific location pattern data acquiring unit 117 acquires, on the basis of the respective location information history data Dp, the user-specific location pattern data Du indicating which of Q temporal location patterns (Q is an integer greater than or equal to 2) each temporal location pattern of each of P users is (P is an integer greater than or equal to 2). The user vector representation specifying unit 118 uses a vector representation specifying model MOu that is a three-layer neural network having a P-dimensional input layer Iu, a Q-dimensional output layer Ou, and an R-dimensional hidden layer Hu (R is an integer greater than or equal to 2 and smaller than P and Q) to perform a machine learning in which P-dimensional One-hot vector specifying one of P users is input to the input layer Iu, and for the user specified in the input, a Q-dimensional One-hot vector specifying the temporal location pattern indicated in the user-specific location pattern data Du is output form the output layer Ou, thereby specifying the row corresponding to each user in a P×R weighting matrix W2 indicating weights from the input layer Iu to the hidden layer Hu as the R-dimensional vector representation VRu representing the feature of the temporal location pattern of each user.

Thus, in the information processing apparatus 100 of the present embodiment, by performing a machine learning using the user vector representation specifying model MOu on the basis of the user-specific location pattern data Du indicating which of Q temporal location patterns each temporal location pattern of each user is, it is possible to specify the R-dimensional vector representation VRu representing the feature of the temporal location patterns of each user. Therefore, according to the information processing apparatus 100 of the present embodiment, it is possible to implement, as a model representing the feature of the temporal location pattern of each user, a model capable of being uniquely specified and holding as much various types of information as possible.

Further, in the information processing apparatus 100 of the present embodiment, each user-specific location pattern data Du is data specifying the temporal location pattern by a combination of at least a date attribute, a time zone, and a staying location of each of the users. Therefore, according to the information processing apparatus 100 of the present embodiment, it is possible to implement, as a model representing the feature of the temporal location pattern of each user, such as on which kind of date, in which time zone, and how long each user tends to stay in each area (in other words, the lifestyle of each user), a model capable of being uniquely specified and holding as much various types of information as possible.

In addition, the information processing apparatus 100 of the present embodiment further includes a clustering processing unit 115 for classifying the vector representation VRa specified for each area into a plurality of clusters, and each of the user-specific location pattern data Du is data for specifying the type of the temporal location pattern by a combination of at least a date attribute, a time zone, and a staying cluster of each user. Therefore, according to the information processing apparatus 100 of the present embodiment, it is possible to implement, as a model representing the feature of the temporal location pattern of each user such as on which kind of date, in which time zone, and how long each user tends to stay in each area, a model capable of being uniquely specified and holding as much various types of information as possible. Further, according to the information processing apparatus 100 of the present embodiment, it is possible to analyze each cluster with respect to the vector representation VRa of each area to interpret the feature of each cluster, and on the basis of this interpretation, to interpret the feature of the temporal location pattern of each user.

B. Modifications

The technology disclosed herein are not limited to the embodiments described above and can be modified in various forms without departing from the scope the technology, and the embodiments can be modified as follows.

The configuration of the information processing apparatus 100 in the above embodiment is merely an example and can be variously modified. For example, in the above embodiment, the information processing apparatus 100 is constituted by a personal computer, but the information processing apparatus 100 may be constituted by another type of computer (for example, servers, smartphones, and tablets, among other devices). Moreover, although the information processing apparatus 100 performs both the area vector representation specifying process and the user vector representation specifying process in the above embodiment, the two processes may be performed by different information processing apparatuses. In this case, it is sufficient that each information processing apparatus has a configuration for executing one of the processes.

The contents of the vector representation specifying process performed by the information processing apparatus 100 in the above embodiment are merely examples and can be variously modified. For example, in the above embodiment, the classification of each item for specifying the type of the staying pattern shown in FIG. 5 is only an example, and other classifications may be adopted. For example, the arrival time may be divided into 1-hour divisions or 3-hour divisions. In addition, the staying time length may be classified into 5 classifications or less, or 7 classifications or more.

Similarly, the classification of each item for specifying the temporal location pattern shown in FIG. 14 is only an example, and other classifications may be adopted. For example, the time zone may be divided into 1-minute divisions or 30-minute divisions. In the above embodiment, it is assumed that the area vector representation specifying process is performed before the user vector representation specifying process (the vector representation VRa of each area is specified, and clustering of the vector representation VRa is performed), and the "staying cluster" is used as an item for specifying the type of the temporal location pattern as shown in FIG. 14, but this is not essential. That is, it is not essential that the area vector representation specifying process is executed before the user vector representation specifying process, and the user vector representation specifying process may be executed independently of the area vector representation specifying process. In this case, instead of "staying cluster", another item indicating a staying location (for example, a staying area) may be used as an item for specifying the type of the temporal location pattern.

In the above embodiment, the items for specifying the temporal usage pattern (staying pattern) shown in FIG. 4 are only examples, and other items may be added or some items may be omitted. Similarly, the items for specifying the type of the temporal location pattern shown in FIG. 13 are only examples, and other items may be added or some items may be omitted.

The number of dimensions of each layer of the area vector representation specifying model MOa and the user vector representation specifying model MOu in the above embodiment are only examples and can be changed arbitrarily. It should be noted that the number of dimensions of the hidden layer Ha and the hidden layer Hu, that is, the number of dimensions of the vector representation VRa and the vector representation VRu is preferably 5 or more, more preferably 20 or more, and still more preferably 50 or more, from the viewpoint of allowing each vector representation to hold as much various types of information as possible. Further, in the above embodiment, a modified version of the Skip-gram model of Word2Vec is used as the area vector representation specifying model MOa and the user vector representation specifying model MOu, but each model is not limited to this one.

In the above embodiment, the vector representation VRa of each area (S140 of FIG. 3) and the vector representation VRu of each user (S240 of FIG. 12) are clustered, but these clustering operations are not essential. In the case of performing these clustering operations, the number of clusters can be arbitrarily set.

In the above embodiment, as the temporal usage pattern (how the location is used with respect to time) of each area, a staying pattern indicating a tendency of a person staying in each area is used, but other temporal usage patterns (for example, the speed of movement of a person in each area and the frequency of entering and exiting of a person in/from each area, among others) may be used as long as they can be grasped on the basis of the location information history.

In the above embodiment, a part of the configuration implemented by a hardware may be replaced with a software, and on the contrary, a part of the configuration implemented by a software may be replaced with a hardware.

An information processing apparatus disclosed herein may be an apparatus for specifying, on the basis of location information history data representing respective location information histories of a plurality of users, a vector representation representing features of respective temporal usage patterns of L areas (L is an integer greater than or equal to 2). The information processing apparatus may include a usage pattern data acquiring unit and an area vector representation specifying unit. The usage pattern data acquiring unit may acquire, on the basis of the each of the location information history data, area-specific usage pattern data indicating which of M temporal usage patterns (M is an integer greater than or equal to 2) the temporal usage pattern of each of the users in each of the areas is. The area vector representation specifying unit may specify, on the basis of the area-specific usage pattern data, an N-dimensional vector representation (N is an integer greater than or equal to 2 and smaller than L and M) representing a feature of the temporal usage pattern of each of the areas.

This information processing apparatus can specify an N-dimensional vector representation representing the feature of the temporal usage pattern of each of the areas on the basis of area-specific usage pattern data indicating which of M temporal usage patterns the temporal usage pattern of each of the users in each of the areas is. Therefore, according to this information processing apparatus, it is possible to implement, as a model representing the feature of the temporal usage pattern, a model capable of being uniquely specified and holding as much various types of information as possible. Further, according to this information processing apparatus, since it is not necessary to collect the POI information in advance or to manually label the POI, it is possible to reduce the labor and cost for modeling the area.

In the information processing apparatus, the area vector representation specifying unit may be configured to use a three-layer neural network having an L-dimensional input layer, an M-dimensional output layer, and an N-dimensional hidden layer to perform a machine learning in which an L-dimensional One-hot vector specifying one of the L areas is input to the input layer, and for the area specified in the input, an M-dimensional One-hot vector specifying a temporal usage pattern indicated by the area-specific usage pattern data is output from the output layer, thereby specifying the row corresponding to each of the areas in an L×N weighting matrix indicating weights from the input layer to the hidden layer as the N-dimensional vector representation representing a feature of the temporal usage pattern of each of the areas. According to this information processing apparatus, it is possible to specify the N-dimensional vector representation that represents the feature of the temporal usage pattern of each area more accurately.

The information processing apparatus may further include a clustering processing unit for classifying the vector representation specified for each of the areas into a plurality of clusters. According to this information processing apparatus, each area can be classified into a plurality of clusters on the basis of the similarity of the temporal usage patterns, and the features of the area belonging to each cluster can be interpreted by analyzing each cluster.

In the information processing apparatus, the temporal usage pattern of each of the areas may be a staying pattern of each of the users in each of the areas. According to this information processing apparatus, it is possible to implement, as a model representing the feature of a staying pattern of each area such as a staying tendency of a person staying in each area, a model capable of being uniquely specified and holding as much various types of information as possible.

In the information processing apparatus, each of the area-specific usage pattern data may be data for specifying the staying pattern by a combination of at least a staying date attribute, a staying time point, and a staying time length of the each of the users in each of the areas. According to this information processing apparatus, it is possible to implement, as a model representing the feature of a staying pattern of each area such as on which kind of date, in which time zone, and how long a person tends to stay in each area, a model capable of being uniquely specified and holding as much various types of information as possible.

The information processing apparatus may further include: a location pattern data acquiring unit for acquiring, on the basis of the location information history data, user-specific location pattern data indicating which of Q temporal location patterns (Q is an integer greater than or equal to 2) each temporal location pattern of each of P users is (P is an integer greater than or equal to 2); a user vector representation specifying unit for specifying, on the basis of the user-specific location pattern data, an R-dimensional vector representation (R is an integer greater than or equal to 2 and smaller than P and Q) representing a feature of the temporal location pattern of each of the users. According to this information processing apparatus, it is possible to specify the R-dimensional vector representation representing the feature of the temporal location pattern of each user on the basis of user-specific location pattern data indicating which of Q types of temporal location patterns each temporal location pattern of each user is. Therefore, according to this information processing apparatus, it is possible to implement, as a model representing the feature of the temporal location pattern of each user, a model capable of being uniquely specified and holding as much various types of information as possible.

In the information processing apparatus, the user vector representation specifying unit may be configured to use a three-layer neural network having a P-dimensional input layer, a Q-dimensional output layer, and an R-dimensional hidden layer (R is an integer greater than or equal to 2 and smaller than P and Q) to perform a machine learning in which a P-dimensional One-hot vector specifying one of the P users is input to the input layer, and for the user specified in the input, a Q-dimensional One-hot vector specifying a temporal location pattern indicated by the user-specific location pattern data is output from the output layer, thereby specifying the row corresponding to each of the users in an P×R weighting matrix indicating weights from the input layer to the hidden layer as the R-dimensional vector representation representing a feature of the temporal location pattern of each of the users. According to the information processing apparatus, it is possible to specify an R-dimensional vector representation that represents the feature of the temporal location pattern of each user more accurately.

In the information processing apparatus, each of the user-specific location pattern data may be data specifying the temporal location pattern by a combination of at least a date attribute, a time zone, and a staying location of each of the users. According to the information processing apparatus, it is possible to implement, as a model representing the feature of the temporal location pattern of each user, such as on which kind of date, in which time zone, and how long each user tends to stay in each area (in other words, the lifestyle of each user), a model capable of being uniquely specified and holding as much various types of information as possible.

The information processing apparatus may further include a clustering processing unit for classifying the vector representation specified for each of the areas into a plurality of clusters, and each of the user-specific location pattern data may be data for specifying the temporal location pattern by a combination of at least a date attribute, a time zone, and a staying cluster of each of the users. According to this information processing apparatus, it is possible to implement, as a model representing the feature of the temporal location pattern of each user such as on which kind of date, in which time zone, and how long each user tends to stay in each area, a model capable of being uniquely specified and holding as much various types of information as possible. Further, according to this information processing apparatus, it is possible to analyze each cluster with respect to the vector representation of each area to interpret the feature of each cluster, and on the basis of this interpretation, to interpret the feature of the temporal location pattern of each user.

Another information processing apparatus disclosed in the present specification may be an apparatus for specifying, on the basis of location information history data representing respective location information histories of a plurality of users, a vector representation representing features of respective temporal location patterns of P users (P is an integer greater than or equal to 2). The information processing apparatus may include a location pattern data acquiring unit and a user vector representation specifying unit. The location pattern data acquiring unit may acquire, on the basis of the location information history data, user-specific location pattern data indicating which of Q temporal location patterns (Q is an integer greater than or equal to 2) the temporal location pattern of each of the users is. The user vector representation specifying unit may specify, on the basis of the user-specific location pattern data, an R-dimensional vector representation (R is an integer greater than or equal to 2 and smaller than P and Q) representing a feature of the temporal location pattern of each of the users.

According to this information processing apparatus, it is possible to specify the R-dimensional vector representation representing the feature of the temporal location pattern of each user on the basis of user-specific location pattern data indicating which of Q types of temporal location patterns each temporal location pattern of each user is. Therefore, according to this information processing apparatus, it is possible to implement, as a model representing the feature of the temporal location pattern of each user, a model capable of being uniquely specified and holding as much various types of information as possible.

What is claimed is:

1. An information processing apparatus for specifying, on the basis of location information history data representing respective location information histories of a plurality of users, a vector representation representing features of respective temporal usage patterns of L areas (L is an integer greater than or equal to 2), comprising a processor programmed to:
    acquire, on the basis of the each of the location information history data, area-specific usage pattern data indicating which of M temporal usage patterns (M is an integer greater than or equal to 2) the temporal usage pattern of each of the users in each of the areas is; and
    specify, on the basis of the area-specific usage pattern data, an N-dimensional vector representation (N is an integer greater than or equal to 2 and smaller than L and M) representing a feature of the temporal usage pattern of each of the areas,
    wherein the processor uses a three-layer neural network having an L-dimensional input layer, an M-dimensional output layer, and an N-dimensional hidden layer to perform a machine learning in which an L-dimensional One-hot vector specifying one of the L areas is input to the input layer, and for the area specified in the input, an M-dimensional One-hot vector specifying a temporal usage pattern indicated by the area-specific usage pattern data is output from the output layer, thereby specifying the row corresponding to each of the areas in an L×N weighting matrix indicating weights from the input layer to the hidden layer as the N-dimensional vector representation representing a feature of the temporal usage pattern of each of the areas.

2. The information processing apparatus according to claim 1, wherein the processor is further programmed to:
    classify the vector representation specified for each of the areas into a plurality of clusters.

3. The information processing apparatus according to claim 1,
    wherein the temporal usage pattern of each of the areas is a staying pattern of each of the users in each of the areas.

4. The information processing apparatus according to claim 3,
    wherein each of the area-specific usage pattern data is data for specifying the staying pattern by a combination of at least a staying date attribute, a staying time point, and a staying time length of the each of the users in each of the areas.

5. The information processing apparatus according to claim 1, wherein the processor is further programmed to:
    acquire, on the basis of the location information history data, user-specific location pattern data indicating which of Q temporal location patterns (Q is an integer greater than or equal to 2) each temporal location pattern of each of P users is (P is an integer greater than or equal to 2); and
    specify, on the basis of the user-specific location pattern data, an R-dimensional vector representation (R is an integer greater than or equal to 2 and smaller than P and Q) representing a feature of the temporal location pattern of each of the users.

6. The information processing apparatus according to claim 5,
    wherein the processor uses a three-layer neural network having a P-dimensional input layer, a Q-dimensional output layer, and an R-dimensional hidden layer (R is an integer greater than or equal to 2 and smaller than P and Q) to perform a machine learning in which a P-dimensional One-hot vector specifying one of the P users is input to the P-dimensional input layer, and for the user specified in the input, a Q-dimensional One-hot vector specifying a temporal location pattern indicated by the user-specific location pattern data is output from the Q-dimensional output layer, thereby specifying the row corresponding to each of the users in an P×R weighting matrix indicating weights from the P-dimensional input layer to the R-dimensional hidden layer as the R-dimensional vector representation representing a feature of the temporal location pattern of each of the users.

7. The information processing apparatus according to claim 5,
    wherein each of the user-specific location pattern data is data specifying the temporal location pattern by a combination of at least a date attribute, a time zone, and a staying location of each of the users.

8. The information processing apparatus according to claim 7, wherein the processor is further programmed to:
    classify the vector representation specified for each of the areas into a plurality of clusters,
    wherein each of the user-specific location pattern data is data for specifying the temporal location pattern by a combination of at least a date attribute, a time zone, and a staying cluster of each of the users.

9. An information processing apparatus for specifying, on the basis of location information history data representing respective location information histories of a plurality of users, a vector representation representing features of respective temporal location patterns of P users (P is an integer greater than or equal to 2), comprising a processor programmed to:
    acquire, on the basis of the location information history data, user-specific location pattern data indicating which of Q temporal location patterns (Q is an integer greater than or equal to 2) the temporal location pattern of each of the users is; and
    specify, on the basis of the user-specific location pattern data, an R-dimensional vector representation (R is an integer greater than or equal to 2 and smaller than P and Q) representing a feature of the temporal location pattern of each of the users,
    wherein the processor uses a three-layer neural network having a P-dimensional input layer, a Q-dimensional output layer, and an R-dimensional hidden layer to perform a machine learning in which a P-dimensional One-hot vector specifying one of the P users is input to the input layer, and for the user specified in the input, a Q-dimensional One-hot vector specifying a temporal location pattern indicated by the user-specific location pattern data is output from the output layer, thereby specifying the row corresponding to each of the users in a P×R weighting matrix indicating weights from the input layer to the hidden layer as the R-dimensional vector representation representing a feature of the temporal location pattern of each of the users.

10. The information processing apparatus according to claim 9,
    wherein each of the user-specific location pattern data is data specifying the temporal location pattern by a combination of at least a date attribute, a time zone, and a staying location of each of the users.

11. An information processing method for specifying, on the basis of location information history data representing respective location information histories of a plurality of users, a vector representation representing features of respective temporal usage patterns of L areas (L is an integer greater than or equal to 2), comprising:
    acquiring, on the basis of the location information history data, area-specific usage pattern data indicating which of M temporal usage patterns (M is an integer greater than or equal to 2) the temporal usage pattern of each of the users in each of the areas is; and
    specifying, on the basis of the area-specific usage pattern data, an N-dimensional vector representation (N is an integer greater than or equal to 2 and smaller than L and M) representing a feature of the temporal usage pattern of each of the areas,
    the method using a three-layer neural network having an L-dimensional input layer, an M-dimensional output layer, and an N-dimensional hidden layer in performing a machine learning in which an L-dimensional One-hot vector specifying one of the L areas is input to the input layer, and for the area specified in the input, an M-dimensional One-hot vector specifying a temporal usage pattern indicated by the area-specific usage pattern data is output from the output layer, thereby specifying the row corresponding to each of the areas in an L×N weighting matrix indicating weights from the input layer to the hidden layer as the N-dimensional vector representation representing a feature of the temporal usage pattern of each of the areas.

12. The information processing method according to claim 11, further comprising:
    classifying the vector representation specified for each of the areas into a plurality of clusters.

13. The information processing method according to claim 11,
    wherein the temporal usage pattern of each of the areas is a staying pattern of each of the users in each of the areas.

14. The information processing method according to claim 13,
    wherein each of the area-specific usage pattern data is data for specifying the staying pattern by a combination of at least a staying date attribute, a staying time point, and a staying time length of the each of the users in each of the areas.

15. The information processing method according to claim 11, further comprising:
    acquiring, on the basis of the location information history data, user-specific location pattern data indicating which of Q temporal location patterns (Q is an integer greater than or equal to 2) each temporal location pattern of each of P users is (P is an integer greater than or equal to 2); and
    specifying, on the basis of the user-specific location pattern data, an R-dimensional vector representation (R is an integer greater than or equal to 2 and smaller than P and Q) representing a feature of the temporal location pattern of each of the users.

16. The information processing method according to claim 15,
    wherein the specifying of the R-dimensional vector representation uses a three-layer neural network having a P-dimensional input layer, a Q-dimensional output layer, and an R-dimensional hidden layer (R is an integer greater than or equal to 2 and smaller than P and Q) to perform a machine learning in which a P-dimensional One-hot vector specifying one of the P users is input to the P-dimensional input layer, and for the user specified in the input, a Q-dimensional One-hot vector specifying a temporal location pattern indicated by the user-specific location pattern data is output from the Q-dimensional output layer, thereby specifying the row corresponding to each of the users in an P×R weighting matrix indicating weights from the P-dimensional input layer to the R-dimensional hidden layer as the R-dimensional vector representation representing a feature of the temporal location pattern of each of the users.

17. The information processing method according to claim 15,
    wherein each of the user-specific location pattern data is data specifying the temporal location pattern by a combination of at least a date attribute, a time zone, and a staying location of each of the users.

18. The information processing method according to claim 17, further comprising:
    classifying the vector representation specified for each of the areas into a plurality of clusters,
    wherein each of the user-specific location pattern data is data for specifying the temporal location pattern by a combination of at least a date attribute, a time zone, and a staying cluster of each of the users.

* * * * *